(12) United States Patent
Kagawa

(10) Patent No.: US 7,187,463 B2
(45) Date of Patent: Mar. 6, 2007

(54) METHOD OF DETERMINING WHETHER REGISTRATION INFORMATION TO BE ERASED INCLUDES INFORMATION RESERVED FOR USE IN A COMMUNICATION JOB

(75) Inventor: Tetsuya Kagawa, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 922 days.

(21) Appl. No.: 10/361,129

(22) Filed: Feb. 7, 2003

(65) Prior Publication Data

US 2003/0179408 A1   Sep. 25, 2003

(30) Foreign Application Priority Data

Feb. 8, 2002 (JP) ............................. 2002-033007
Sep. 20, 2002 (JP) ............................. 2002-274446
Nov. 22, 2002 (JP) ............................. 2002-339776

(51) Int. Cl.
G06F 3/12 (2006.01)
(52) U.S. Cl. .................... 358/1.15; 358/1.16; 358/400; 358/440
(58) Field of Classification Search ............... 358/1.15, 358/1.16, 400, 440
See application file for complete search history.

(56) References Cited

U.S. PATENT DOCUMENTS

| 5,097,187 A | 3/1992 | Koshiishi et al. |
| 5,384,836 A * | 1/1995 | Otsuka .................. 379/100.14 |
| 5,452,474 A | 9/1995 | Kagawa |
| 5,597,311 A | 1/1997 | Yanagida et al. |
| 5,608,545 A | 3/1997 | Kagawa |
| 5,775,918 A | 7/1998 | Yanagida et al. |
| 5,995,239 A | 11/1999 | Kagawa et al. |
| 5,995,240 A * | 11/1999 | Sato ........................... 358/407 |
| 6,031,637 A * | 2/2000 | Shibata et al. ............... 358/468 |
| 6,160,637 A | 12/2000 | Kagawa |
| 6,222,645 B1 | 4/2001 | Kagawa |
| 6,574,012 B1 | 6/2003 | Kagawa |
| 2002/0044302 A1 | 4/2002 | Kagawa |
| 2002/0048048 A1 | 4/2002 | Kagawa |
| 2002/0093698 A1 | 7/2002 | Kagawa |
| 2002/0120700 A1 | 8/2002 | Tamura |
| 2003/0030847 A1 | 2/2003 | Amemiya |

FOREIGN PATENT DOCUMENTS

| JP | 11234447 | 8/1999 |
| JP | 2001186239 | 7/2001 |

* cited by examiner

Primary Examiner—Kimberly Williams
Assistant Examiner—Peter K Huntsinger
(74) Attorney, Agent, or Firm—Cooper & Dunham LLP

(57) ABSTRACT

A communication apparatus having means for recording registration information including telephone numbers and address information, which is registered individually by a user per an apparatus or a user, is provided. In the device, a selection of an attribute of the registration information that is to be erased is accepted, and only the registration information having a selected attribute is extracted and erased all together. At this time, whether the registration information to be erased includes information reserved for use in a job or not is determined. If the reserved information is included, the registration information to be erased other than the reserved information is erased all together. In this manner, the operability of the device upon managing the recorded registration information is improved.

24 Claims, 17 Drawing Sheets total erasion of registered data
1. erasing all registered ID
2. erasing all one-touch address
3. erasing all abbreviated address
4. erasing all group address
5. erasing all F code box
6. erasing all program
7. erasing all image memory

FIG. 4 there is information cannot be erased because of its current use

FIG. 5 communication management report
13:30 one-touch 01 F.15 transmission OK
13:45 abbreviation 025 P.2 transmission OK
. . . .

FIG. 6

FIG. 11 telephone number management memory | | management memory for group key registration | | | | | |
---|---|---|---|---|---|---|---
key | number/address | group 00 | group 01 | group 02 | group 03 | group 04 | group 05
one-touch 000 | 03-1234-5678 | 1 | | | | |
one-touch 001 | 001-1-1234-4321 | | | | | |
one-touch 002 | 090-1234-5432 | | | 1 | | |
one-touch 003 | 0120-123456 | | | | 1 | |
one-touch 004 | 161-046-222-1111 | 1 | | | | |
... | | | | | | |
abbreviation 000 | 06-1234-5678 | 1 | | | | |
abbreviation 001 | 001-1-1234-2222 | | | 1 | | |
abbreviation 002 | 090-1234-5432 | | | | 1 | |
abbreviation 003 | 0120-123457 | | | | | |
abbreviation 004 | 161-046-222-3333 | | | | 1 | |
... | | | | | | |
temporary address 00 | 03-9876-5432 | | | | | |
temporary address 01 | | | | | | |
temporary address 02 | | | | | | |
temporary address 03 | | | | | | |
temporary address 04 | | | | | | |
temporary address 05 | | | | | | |
... | | | | | | |

METHOD OF DETERMINING WHETHER REGISTRATION INFORMATION TO BE ERASED INCLUDES INFORMATION RESERVED FOR USE IN A COMMUNICATION JOB

BACKGROUND OF THE INVENTION

1. Field of the Invention

This invention relates in general to a communication apparatus, such as a facsimile having means for storing registration information including telephone numbers and address information, which is registered individually by a user per an apparatus or a user, particularly to a communication apparatus having a novel feature in controlling the erasing instruction of such a registration information.

2. Description of the Related Art

As a communication apparatus having means for storing registration information registered individually by a user per an apparatus or a user, a facsimile capable of storing telephone numbers, address information and the like, has been known. As such a facsimile, for example, it is known a facsimile provided with a one-touch function that a telephone number or an address is allocated to a particular one-touch key to be recorded so that a user can easily specify a desired address by pressing the key.

Such an information allocation (registration) to an one-touch key, or erasing instruction or alteration of registration information is, for example, executed by a user, who operates the keys of an input-section while observing the display of a displaying section, as shown in FIG. 19. According to such a facsimile, however, the user has to operate the keys one by one to execute processes of registering, erasing, or altering information. It is a common case that the user may desire to erase registered contents from the facsimile containing considerable volume of secret information when the user disposes of it or gives it to another person, lest secret matters should be leaked. However, an erasing operation for that purpose is cumbersome because every registered piece of information has to be erased one by one as described above.

As a device in which the above problem is solved, it is cited a facsimile disclosed in the Japanese Laid Open Publication No. 11-234447 and a communication terminal device disclosed in the Japanese Laid Open Publication No. 2001-186239. The former device allows a user to erase all the dial information together according to a prescribed key operation or to initialize entire setting information to the original state set by a manufacturer at once, making it possible for the user to easily erase all the registration information together. The latter device allows a user to initialize registered data or function settings all at once according to a prescribed operation, also making it possible for the user to easily erase the registration information all together.

When a user erases all the registration information together, various cases are considered, such as of disposal, transfer, or assignment. In each case, actually, exact information needed to be erased varies. For example, all the information is preferably deleted in the case of disposal, but, in the case of transfer, registered addresses for a group transmission may be preferably maintained while registered addresses for a one-touch key or an abbreviated dial is deleted.

However, in each device disclosed in the Japanese Laid Open Publication No. 11-234447 or in the Japanese Laid Open Publication No. 2001-186239, executing a prescribed key operation results in erasing of all the dial information or initializing of the entire registration information. Therefore, it is impossible to erase a group of registration information case by case according to its category in accordance with the purpose of a user, thus, it is inevitable to erase or initialize necessary data along with unnecessary data for erasing instruction. As a result, registration information to be maintained has to be re-recorded, which leads to a problem of cumbersome operations.

SUMMARY OF THE INVENTION

According to the foregoing description, it is an object of this invention is to solve the above problems so as to improve the operability of a communication apparatus upon managing registration information in the device.

To achieve the above object, the present invention provides a communication apparatus, comprising: first storing means for storing registration information including registration information groups identified by a plurality of attributes; first accepting means for accepting a selection of an attribute of a registration information group required to be erased; first extracting means for extracting information of the registration information group having the attribute the selection of which is accepted by the first accepting means; first erasing means for erasing the information of the registration information group extracted by the first extracting means; and determining means for determining as to whether the registration information group required to be erased includes information reserved for use in a communication job when the erasing(means executes an erasing operation The first erasing means erases at one time the information of the registration information group extracted by the first extracting means when the determining means determines as that the information of the registration information group required to be erased does not includes information reserved for use in a communication job, and the first erasing means erases at one time the information of the registration information group extracted by the first extracting means, excluding the information reserved for use in a communication job, when the determining means determines as that the information of the registration information group required to be erased includes information reserved for use in the communication job.

In the above communication apparatus, the registration information stored in the first storing means includes at least one of telephone numbers, names, addresses, communication capabilities relating to the communication apparatus and other communication apparatuses, and the plurality attributes include attributes of a registration identification, a one-touch address, an abbreviation address, a group address, an F-code, a program, and an image memory content.

The communication apparatus can further comprises notifying means for notifying a user of an execution result of the erasing operation after the first erasing means has executed the erasing operation.

The communication apparatus above can also further comprises second storing means for storing history information including a plurality of history information elements indicative of communication job histories performed by the communication apparatus; searching means for searching a history information using registration information group erased by the first erasing means; and second erasing means for erasing the history information element searched by the searching means.

The communication apparatus can further comprises second accepting means for accepting a selection between erasing and non-erasing instructions with respect to the information of the registration group required to be erased when the determining, means determines as that the information of the registration information required to be erased includes information reserved for use in a communication job; and canceling means for canceling the communication job when the second accepting means accepts the selection of the erasing instruction. The first erasing means erases at one time the information of the registration information group including the information reserved for use in the communication job after the canceling means cancels the communication job scheduled to use the information reserved.

The aforementioned communication apparatus can further comprises third accepting means for accepting a selection between erasing and non-erasing instructions with respect to the information of the registration information group required to be erased when the determining means determines as that the information of the registration information group required to be erased includes information reserved for use in a communication job; wherein the first erasing means erases at one time the information of the registration information group including the information reserved for use in the communication job after a completion of the communication job scheduled to use the information reserved, when the third accepting means accepts the selection of the erasing instruction.

The above communication apparatus can further comprises second extracting, means for extracting common information included in the registration information group required to be erased and in another registration information group having another attribute; and fourth accepting means for accepting a selection between erasing and non-erasing instructions with respect to the common information extracted when the second extracting means has extracted common information. The first erasing means erases at one time information of the registration information group required to be erased and the common information extracted by the second extracting means when the fourth means accepts the selection of the erasing instruction.

The communication apparatus can further comprises outputting means for outputting the information of the registration information group required to be erased in a way such that information actually erased and information saved from the erasing instruction are distinguished from each other when the first erasing means erases the registration information group.

The communication apparatus can further comprises transmitting means for transmitting the information of the registration information group erased by the erasing means to an external apparatus in a format allowing the external apparatus to recognize the information as the information erased when the first erasing means erases the information of the registration information group.

The communication apparatus can further comprises fifth accepting means for accepting an information recovering instruction for recovering the information of the registration information group erased by the first erasing means; and obtaining means for obtaining data of the information of the registration information group required to be recovered from the external apparatus when the fifth accepting means accepts the information recovering In addition, the present invention also provides a communication controlling method, comprising the steps of: storing registration information including registration information groups identified by a plurality of attributes; accepting a selection of an attribute of a registration information group required to be erased; extracting information of the registration information group having the attribute of which the selection is accepted; determining as to whether the registration information required to be erased includes information reserved for use in a communication job at a time of an erasing operation relative to the information of the registration information group required to be erased; erasing at one time the information of the registration information group when the information of the registration information group required to be erased is determined in the determining step as not including information reserved for use in a communication job; and erasing at one time the information of the registration information group required to be erased, excluding the information reserved for use in the communication job when the information of the registration information group required to be erased is determined by the determining step as including the information reserved for use in the communication job.

In the aforementioned communication controlling method, the registration information stored in the first storing means includes at least one of telephone numbers, names, addresses, communication capabilities relating to the communication apparatus and other communication apparatuses, and the plurality attributes include attributes of a registration identification, a one-touch address, an abbreviation address, a group address, an F-code, a program, and an image memory content.

The invention further provides a program prepared for a computer controlling a communication apparatus. The communication apparatus comprises: storing means for storing, registration information including registration information group identified by a plurality of attributes; accepting means for accepting a selection of an attribute ol a registration information group required to be erased; extracting means for extracting information of the registration information group having the attribute the selection of which is accepted by the accepting means; erasing means for erasing the information of the registration information group extracted by the extracting means; and determining means for determining as to whether the registration information group required to be erased includes information reserved for use in a communication job when the erasing means executes an erasing operation. The erasing means erases at one time the information extracted by the extracting means when the determining means determines as that the registration information group required to be erased does not include information reserved for use in a communication job, and the erasing means erases at one time the information of the registration information group required to be erased, excluding the information reserved for use in a communication job, when the determining means determines as that the information of the registration information group extracted by the extracting means includes the information reserved for use in the communication job.

In the above program, the registration information stored in the first storing means includes at least one of telephone numbers, names, addresses, communication capabilities relating to the communication apparatus and other communication apparatuses, and the plurality attributes include attributes of a registration identification, a one-touch address, an abbreviation address, a group address, an F-code, a program, and an image memory content.

The present invention also provides a computer readable recording medium for storing the computer program described above.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

FIG. 4 is a drawing showing an example of display on the above facsimile upon executing the registration information erasing operation;

FIG. 5 is a drawing showing another example of the above display;

FIG. 6 is a drawing showing an example of the output of history information on a facsimile, which is the second embodiment of the communication apparatus of the present invention;

FIG. 11 is an explanatory drawing for explaining the storing method of group address information for the facsimile of the fourth embodiment;

DESCRIPTION OF THE PREFERRED EMBODIMENT

First Embodiment

Figure 1:
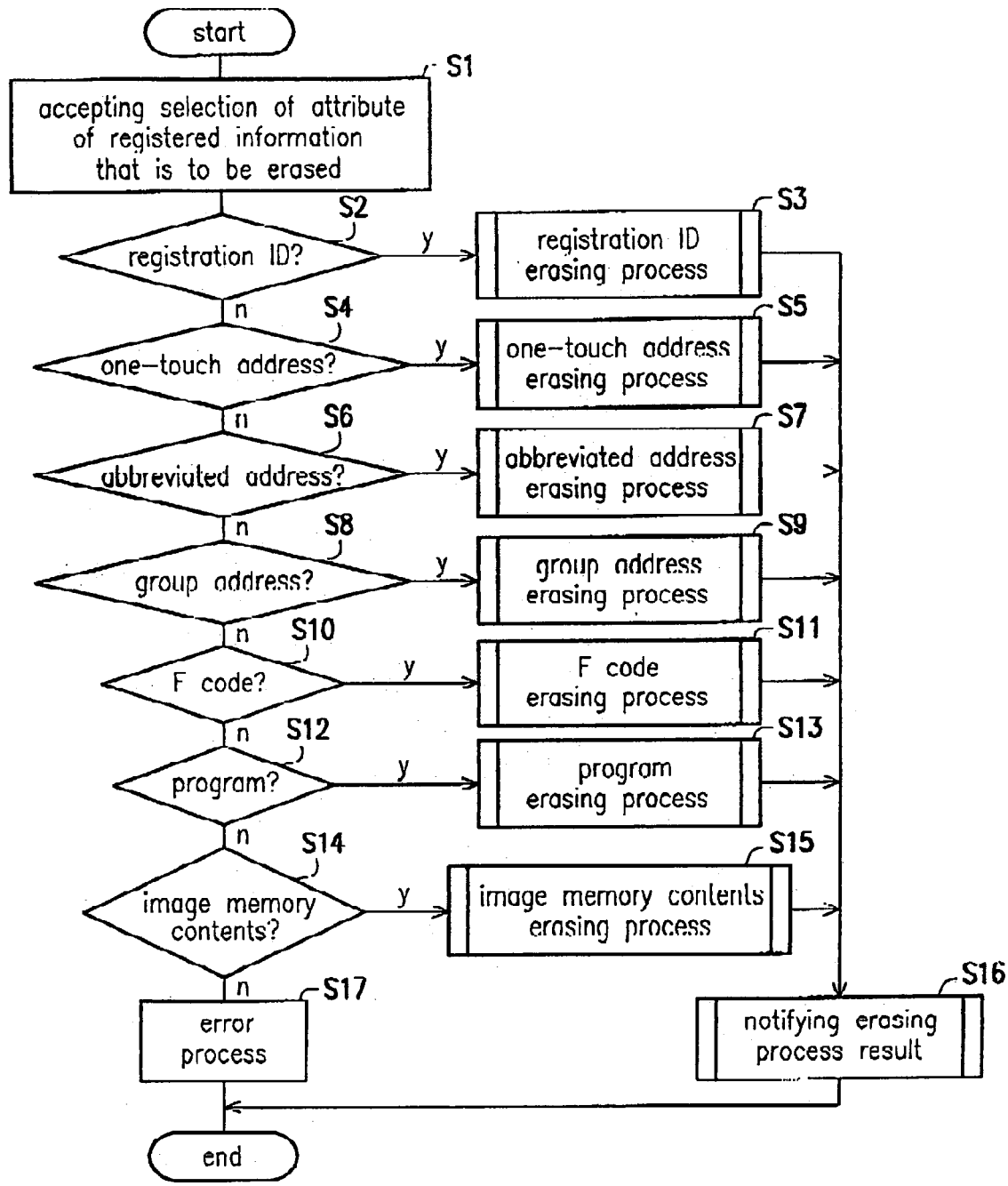
FIG. 1 is a flow chart showing the operation of a registration information erasing operation carried out in a facsimile, which is the first embodiment of the communication apparatus of the present invention.

Hereinafter, the preferred embodiment of the present invention is to be described referring to the drawings.

Figure 2:
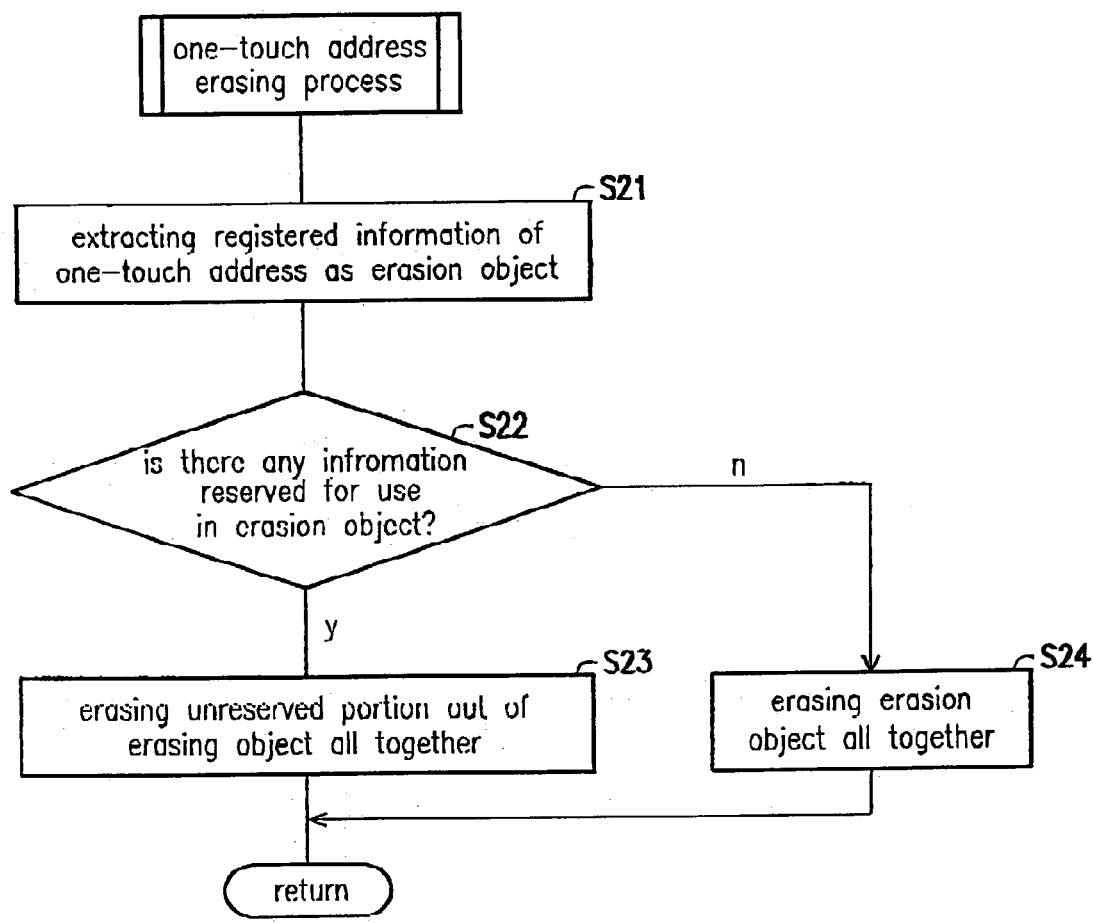
FIG. 2 is a flow chart showing the partial details of the flow chart of FIG. 1.
Figure 3:
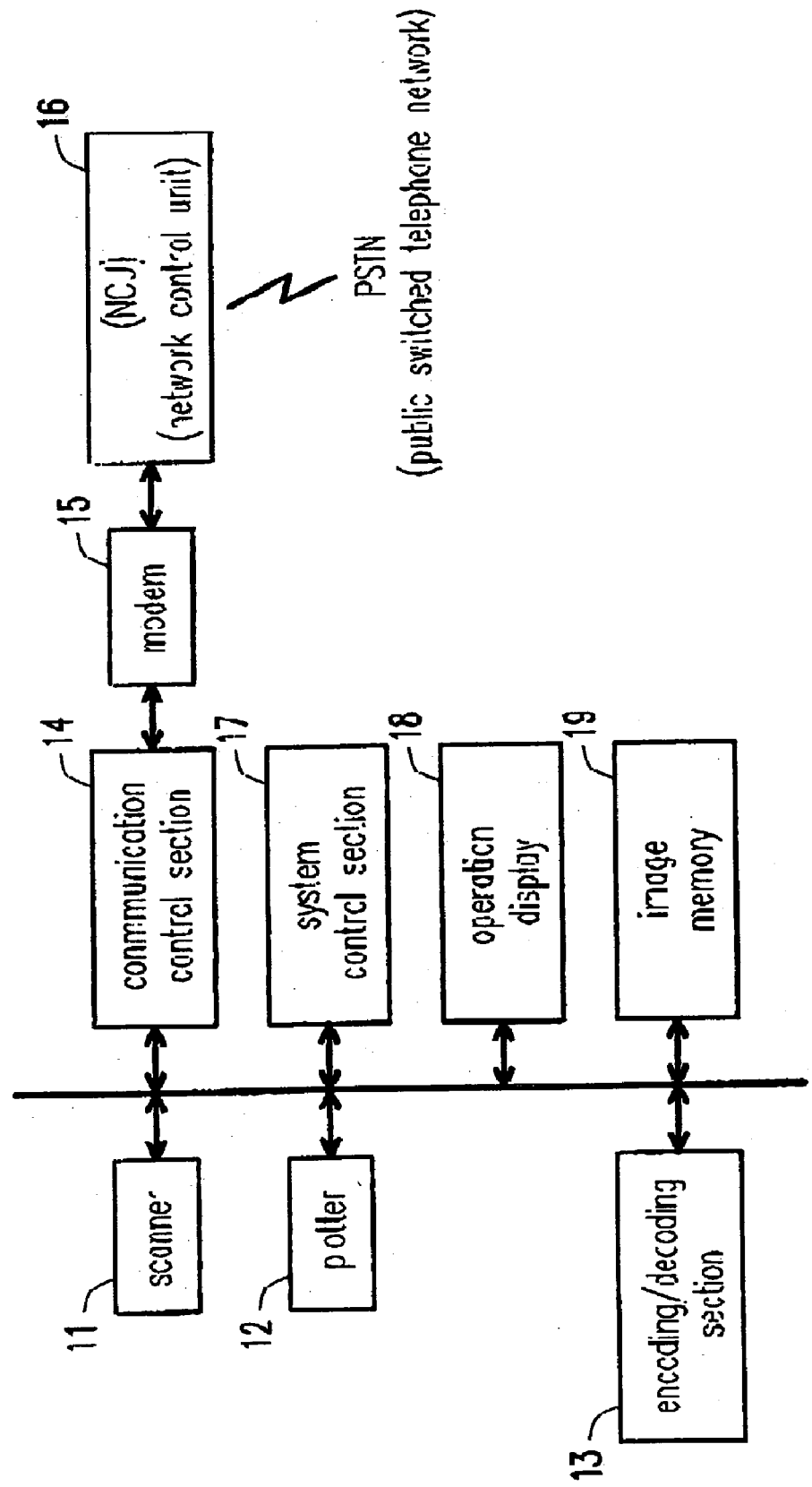
FIG. 3 is a block diagram showing the constitution of the facsimile that is the first embodiment of the communication apparatus of the present invention.

First, a description is made of the facsimile that is the first embodiment of the communication apparatus of the present invention. FIG. 1 is the flow chart showing the operation of the registration information erasing operation carried out in the facsimile. FIG. 2 is the flow chart showing the partial details of the flow chart of FIG. 1. FIG. 3 is the block diagram showing the constitution of the facsimile. FIG. 4 is the drawing shoving an example of display on the facsimile upon executing the registration information erasing operation. FIG. 5 is the drawing showing another example of the above display.

The facsimile of the present invention comprises a scanner 11, a plotter 12, an encoding/decoding section 13, a communication control section 14, a system control section 17, an operation display 18, and an image memory 19, are connected to each other through a system bus 20. The scanner 11 is an image reading means for reading the image data of an image required to be transmitted. The plotter 12 is an image forming means for forming an image on a sheet based on received image information. It will be appreciated that a variety of reports, the contents of settings, and registration information can be printed out on a sheet as images.

The encoding/decoding section 13 is a unit for generating compressed data by encoding image information required to be transmitted, or decoding (expanding) received image information consisting of encoded compressed data and generating the data corresponding to the compressed data in a state of pre-encoding. The communication control section 14 is a communication means for executing an actual communication operation conforming to a given communication protocol, exchanging information with an external apparatus using a modem 15 for modulating/demodulating communication data and a NCU (Network Control Unit) 16 connected to the PSTN (Public Switched Telephone Network) for controlling calls and incoming calls.

The system control section 17 having a CPU, ROM, and RAM is the control section controlling the facsimile integrally, controlling each sections by making the CPU execute various control programs stored in the ROM. The RAM is a memory means for use as the work memory of the CPU, or for storing necessary data. In the Facsimile of this embodiment, part of the RAM constitutes a rewritable nonvolatile memory means, such as SRAM (Static Random-Access Memory) and the like, so that the RAM also functions as a memory means for storing registration information including registration information groups identified by a plurality of attributes. The registration information stored in the memory means includes at least one of telephone numbers, names, addresses, communication capabilities relating to said communication apparatus and other communication apparatuses, and the plurality attributes include attributes of a registration identification, a one-touch address, an abbreviation address, a group address, an F-code, a program, and an image memory content. Further, the RAM also functions as means for storing history information showing the operation history of the facsimile. The ROM is a nonvolatile memory means for storing various programs, tables, etc. It will be recognized that if the ROM is replaced with a rewritable memory means, the programs can be upgraded in tandem with the progress of technology.

The operation display 18 is a unit for displaying the various setting status of the facsimile and allowing a user to execute various operations or settings or to input information. The operation display can be constituted of a liquid crystal display comprising laminated touch panels and different keys. The image memory 19 is a unit for storing, the image data of an image read by the scanner 1 and image information received by the communication control section 14. The image memory also functions as a memory means for storing registration information consisting of image data registered by a user, including a mark added to an image upon transmitting it. While the image memory 19 is composed mainly of RAM, rewritable nonvolatile memory means, such as SRAM or hard disk, are also employed according to a need.

In this facsimile, when a total erasing instruction of registration information is selected, the system control section 17 starts the processes shown in FIG. 1. The processes are carried out by the CPU executing a required program and are the process related to the embodiment of the control method of the communication apparatus according to the present invention. The processes are carried out as the same function and element according to the description above in the following flow charts of respective embodiments. First, at step S1, the selection of the attribute of a registration information group required to be erased is accepted. The selection can be made, for example, by making a display, as shown in FIG. 4, appear on the operation display 18 to prompt a user to make a selection. While a registration ID, one-touch address, abbreviated address, group address, F-code, program, and the contents of image memory are listed on the display as the attribute of the registration information group required to be erased, it is applicable to prepare a setting so that other attributes can also be selected.

The registration ID is identifying information for specifying a transmission target, such as an apparatus or a person, when a polling transmission or a confidential transmission is carried out. The one-touch address is address information, such as the telephone number of a transmission destination, which is recorded by linking the address information to a specific key. The abbreviated address is another address information, such as the telephone number of a transmission destination, which is recorded by liking the address information to a series of specific keys. The group address is still another address information consisting of the recorded address information of a plurality of transmission destination. The F-code is a code conforming to the international standard established by ITU-T (International Telecommunication Union Telecommunication Standardizing Section), and is an identifying information that can be allocated to an apparatus or an individual, which enables a confidential transmission using the identifying information as a sub-address. The program comprises a series of pre-recorded operations that are frequently executed. The contents of image memory are the contents pre-stored in the image memory, such as marks attached to transmitting images or images frequently transmitted.

Now, turning back to FIG. 1. After the selection of an attribute is accepted at step S1, step S2 follows, where whether the selected attribute is a registration ID or not is determined. If it is the registration ID, step S3 follows, where a registration ID erasing operation is carried out to erase the information of the registration ID. Then, the program proceeds to step S16, where a result of the erasing operation is notified to the user and the whole process ends. The notification can be made, for example, by displaying a message on the operation display 18. There is a case, as described later, where part of registration information group having the selected attribute is not erased. In such a case, refraining from total erasing instruction can be notified to the user by displaying a message as shown in FIG. 5. This notification may be made by a report printed out with the plotter 12. At this step, each system control section 17, operation display 18, and plotter 12 functions as the erasing instruction result notifying means.

When the selected attribute is not a registration ID at step S2, step S4 follows, where whether the attribute is a one-touch address or not is determined. If it is the one-touch address, step S5 follows, where a one-touch address erasing operation is carried out to erase the information of the one-touch address. Then, the process proceeds to step S116, where a result of the erasing instruction process is notified to the user and the whole process ends. When the selected attribute is not a one-touch address at step S4, step S6 follows. Likewise, whether the selected attribute is an abbreviated address, group address, F-code, program, or the contents of image memory, is determined in order at respective steps. At each step, upon finding that the selected attribute belongs to one of those, the erasing operation of the registration information group having such an attribute is carried out. Then, at step S16, a result of the erasing operation is notified to the user and the whole process ends. When the registration information group required to be erased does not belong to any of the above attributes, no expected attribute has been selected. Such a case is regarded as the case that a normal selection has not been carried out, which is followed by step S17, where an error process is carried out to end the process.

Next, respective erasing operations of the registration information group having each attribute, as shown by step S3, S5, etc., in FIG. 1, are to be described in detail. Here, the one-touch address erasing operation shown by step S5 is described as an example. The one-touch address erasing operation is further represented by the flow chart in FIG. 2. At step S21, one-touch address information, which is the registration information group having an attribute selected as an erasing instruction object, is extracted as the erasing instruction object. At this step, the system control section 17 function is as the extracting means.

Then, at step S22, it is determined whether the extracted erasing instruction object includes registration information reserved for use or not. It will be appreciated that the reservation for use refers to a case where a communication job requires certain registration information when the communication job is on progress or reserved for execution, for example, when a document file is sending out or a reserved transmission, a polling transmission and the like are preset. Such a case is regarded as the case that the communication job reserves the registration information for use in the communication job. In the case of the one-touch address, which is the object of erasing operation, for example, if the one-touch address is set as the transmission destination of the reservation transmission, the set one-touch address has been reserved for a communication job of the reservation transmission.

At step S22, where existence or non-existence of the reserved information is determined, the system control section 17 functions as the reservation determining means. If the existence of the reserved information is determined, step S23 follows, where the unreserved portion of the erasing instruction object is totally erased. Meanwhile, if the non-existence of the reserved information is determined at step S22, step S24 follows, where all the erasing instruction object is erased together. It will be appreciated that the total erasing instruction as described here is not necessary to be a simultaneous erasing instruction of the whole erasing instruction objects. It is referred to as an operation that the erasing instruction object is totally erased without requiring a user to execute further operations once a final confirmation for erasing has been made. That is, in executing the actual total erasing instruction, certain erasing instruction object may not be erased until a specific point of erasing instruction arrives, such as the time of communication job completion. At step S23 or S24, the system control section functions as the erasing means. After the above processes are over, the one-touch address erasing operation is ended to return to the previous process.

While the one-touch address erasing operation is closely described here, other erasing, operations are equal to the one-touch address erasing operation, except that extracted each registration information is different at step S21. Therefore, further explanation of the other erasing operations is omitted. It will be appreciated that the total erasing instruction process is repeatedly executed in several times when registration information group having a plurality of attributes is to be erased. Also, it is applicable to set a mode for erasing at one time the registration information.

According to a communication apparatus executing the processes as described above, respective registration information in the device can be totally erased for every selected type of information according to the disposal, transfer, assignment, etc., of the device. Therefore, the operability of the device can be improved for the management of the registration information in the device. Besides, registration information reserved for use in the communication job is not erased so that such an accident can be prevented that other user has happened to erase the reserved registration information. In this manner, the erasing operation can be carried out without hampering business operations. While the process of notification is not essential, notifying a result of the erasing operation to a user allows the user to recognize that certain registration information has not been erased since it has been reserved for use in a process, and to erase the spared information anew after the process is over. Therefore, the reliability of the device can be improved. It is recommended to make a setting so that the total erasing operation, as described above, is executed from a menu for an manager or is not executed unless a password is entered, because a wrong execution of the process results in a great inconvenience. In this manner, the reliability of the device can be further improved.

Second Embodiment

Figure 7:
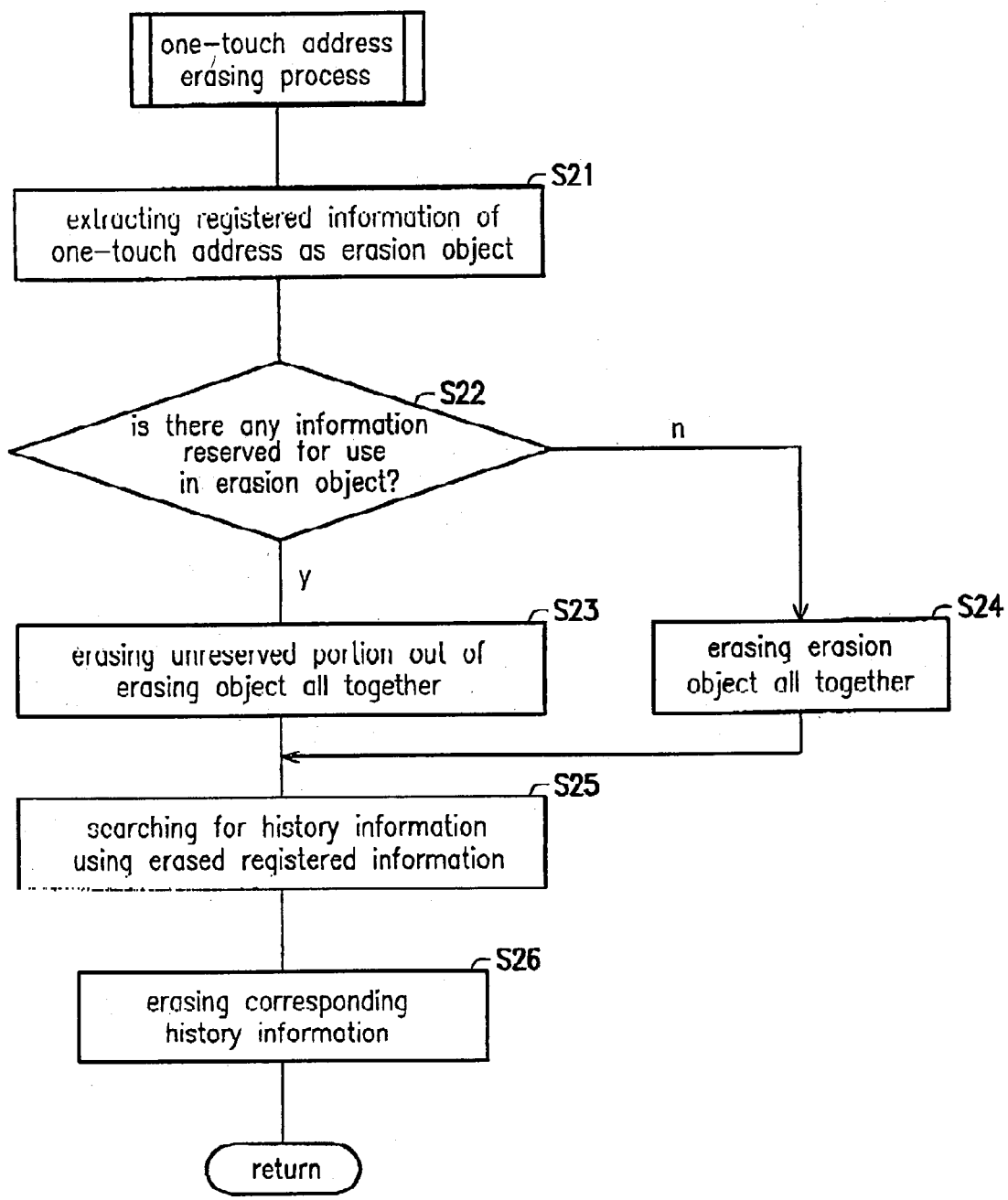
FIG. 7 is a flow chart showing part of the operation of the registration information erasing operation carried out in the facsimile of the second embodiment.

Next, a description is made of the facsimile that is the second embodiment of the communication apparatus of the present invention. FIG. 6 is the drawing showing an example of the output of history information on the facsimile, and FIG. 7 is the flow chart showing part of the operation of the registration information erasing operation carried out in the facsimile. This facsimile is the same as the facsimile of the first embodiment, except that the erasing operation of registration information group having each attribute is different from that of the first embodiment. Accordingly, the description not pertaining to the difference of the erasing operation is omitted or simplified.

In this facsimile, as in the facsimile of the first embodiment, the RAM arranged in the system control section 17 records history information showing the operation history of this facsimile. When a transmission is made using a one-touch key or an abbreviated dial, the registration information of the key and dial itself is also recorded as the history information. (This description is spared in the first embodiment). The history information can be printed out on the plotter 12 as a communication management report, and an example of whose contents is shown in FIG. 6. The information of the one-touch key and abbreviated dial used (cited) in the history information may fall into a category of a secret matter. Therefore, the facsimile of the second embodiment is arranged in such a way that it erases the history information using erased registration information all together upon executing the erasing operation.

In this facsimile, as in the case of the first embodiment, when the total erasing(instruction of registration information is selected, the system control section 17 executes the processes shown by the flow chart in FIG. 1. However, respective erasing operations of registration information group having each attribute, which are shown by step S3, S5, etc., in FIG. 1, are different from that of the first embodiment. Here, the one-touch address erasing operation shown by step S5 is described as one example of such processes. The one-touch address erasing operation is further represented by the now chart in FIG. 7, wherein the processes of step S21 and S24 are the same as that of the first embodiment, which is described using FIG. 2, so that a further description is omitted.

After the total erasing operation has been carried out at step S23 or at step S24, history information using erased registration information is searched for at step S25. In this search, for example, when the one-touch address information of number 1 is erased, the history information using erased information appears on the first line of the history information as shown in FIG. 6, which represents the information sent out at 13:30. This information is to be erased at step S26 to follow. After that, the one-touch touch address erasing operation is ended to return to the previous process. While the one-touch address erasing operation is closely described here, other erasing operations are equal to the one-touch address erasing operation, except that extracted each registration information is different at step S21. Therefore, further explanation of the other erasing operations is omitted. According to a communication apparatus executing the processes as described above, history information related to erased registration information can be erased all together. Therefore, a leak of secret information can be prevented, which makes possible to improve the reliability of the device.

Third Embodiment

Figure 8:
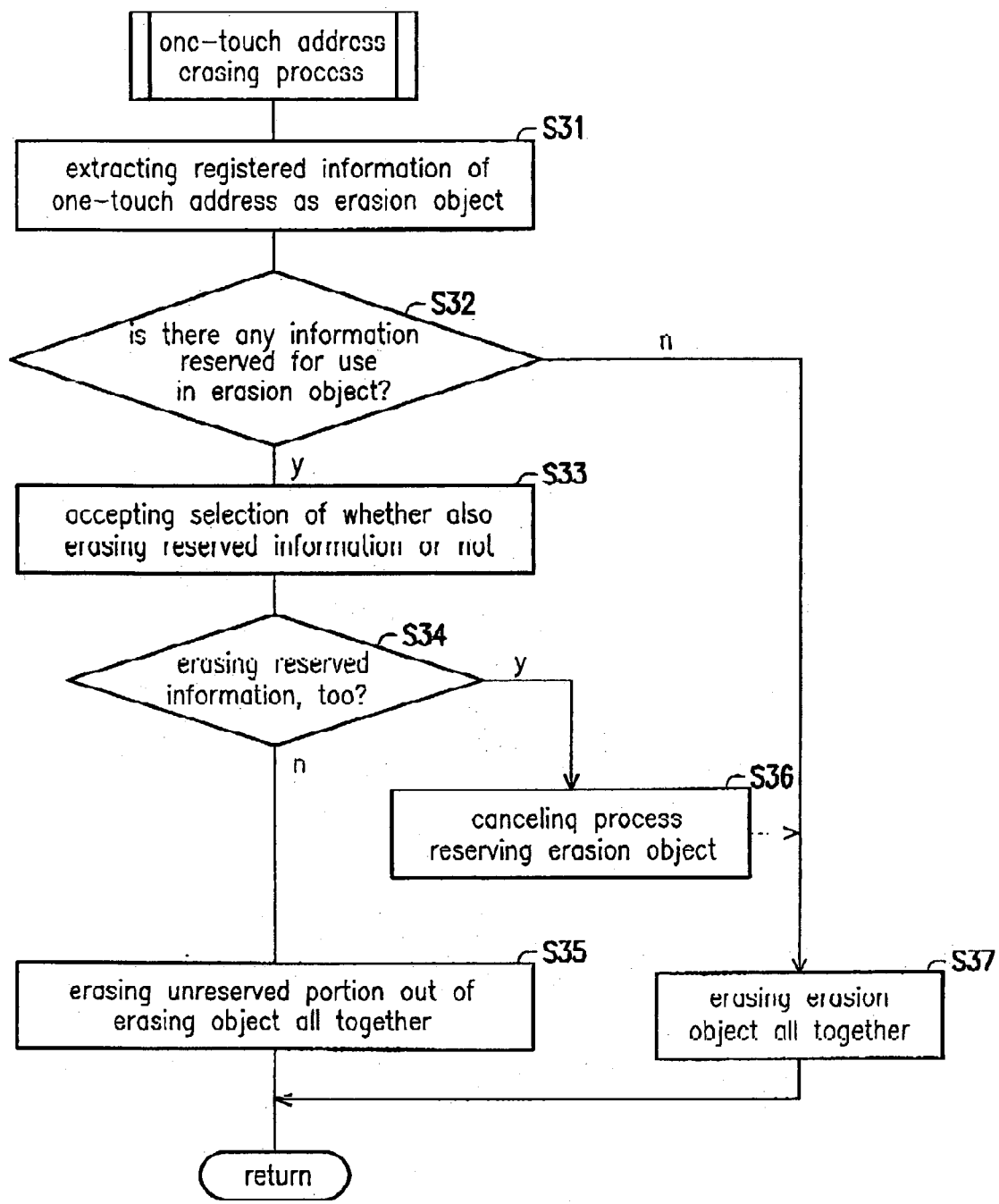
FIG. 8 is a flow chart showing part of the operation of the registration information erasing operation carried out in a facsimile, which is the third embodiment of the communication apparatus of the present invention.
Figure 9:
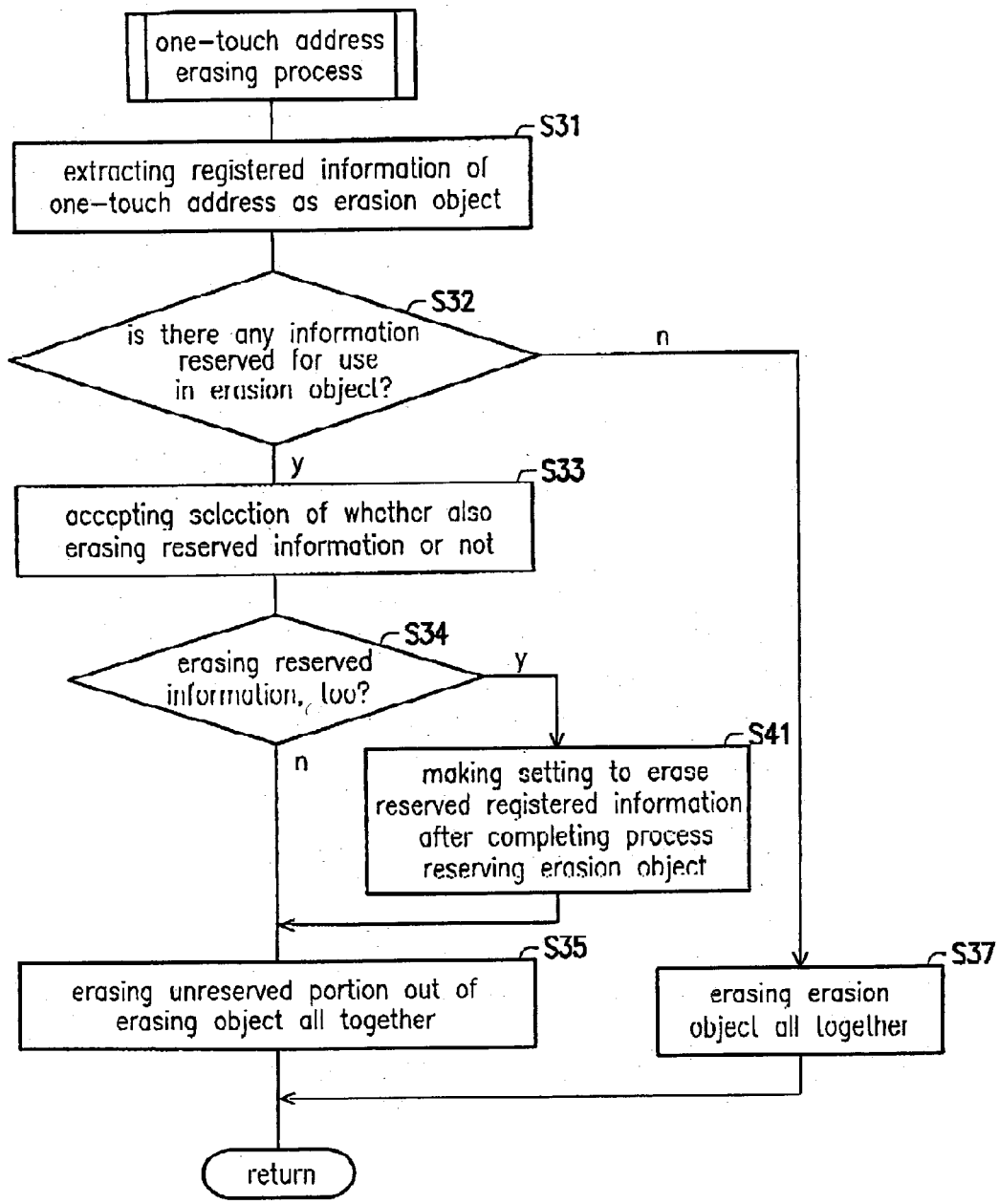
FIG. 9 is a flow chart showing another example of the above operation of the facsimile of the third embodiment.

Next, a description is made of the facsimile that is the third embodiment of the communication apparatus of the present invention. FIG. 8 is the flow chart showing part of the operation of the registration information erasing operation carried out in the facsimile, and FIG. 9 is the flow chart showing another example of the above operation. This facsimile is the same as the facsimile of the first embodiment, except that the erasing operation of registration information having each attribute is different from that of the first embodiment. Accordingly, the description not pertaining to the difference of the erasing operation is omitted or simplified.

In this facsimile, as in the case of the first embodiment, when the total erasing instruction of registration information is selected, the system control section 17 executes the processes shown by the flow chart in FIG. 1. However, respective erasing operations of registration information group having each attribute are executed as the processes shown in FIG. 8, instead of being executed as the processes shown in FIG. 2 of the first embodiment. Here, the one-touch address erasing operation is also described as one example of such processes. The one-touch address erasing operation is further represented by the flow chart in FIG. 8, wherein the processes of step S31 and S32 are the same as that of the step S21 and S22 of the first embodiment, which is described using FIG. 2, so that a further description is omitted.

When any registration information reserved for use is found as an erasing object at step S32, step S33 follows, where a selection on whether the reserved registration information is also erased or not is accepted. At this time, the reserved registration information and the information of a communication job reserving the registration information are displayed for a user to make the selection. After the selection by the user, step S34 follows, where a determination is made on whether to erase or not the reserved information. If it is not be erased, step S35 follows, where only the unreserved portion is totally erased out of the whole erasing instruction object, as in the case of step S23 in FIG. 2. If it is erased, step S36 follows, where the process (communication job) reserving the registration information of erasing instruction object is canceled. For example, if the communication job is a reserved transmission, the reservation registration of the transmission is deleted.

Once the above process is executed, the erasing instruction object does not include reserved registration information any more, which leads the process to step S37, where the whole erasing instruction object is erased all together. When no reserved registration information is found at step S32, the process jumps to step S37, where the whole erasing instruction object is erased all together, as in the case of step S24 in FIG. 2. After the total erasing operation at step S35 or at step S37, the one-touch address erasing operation is ended to return to the previous process. While the one-touch address erasing operation is closely described here, other erasing operations are equal to the one-touch address erasing operation, except that extracted each registration information is different at step S31. Therefore, further explanation of the other erasing operations is omitted. According to a communication apparatus executing the processes as described above, when registration information to be erased is reserved for use, the reservation is notified to a user to allow the user to execute the erasing operation according to user's need, so that the operability of the device can be improved.

It will be appreciated that the process of step S36 can be replaced with the process of step S41 shown in FIG. 9 in the above one-touch address erasing operation. In other words, a setting can be made so as to erase reserved registration information after a process (communication job) reserving the information has been over when a selection is made to also erase the reserved registration information. Then, according to the setting, step S35 follows, where only the unreserved portion of the erasing instruction object is totally erased. In this case, the erasing operation set at step S41 is automatically executed after the communication job reserving registration information has ended.

According to a communication apparatus executing the above processes, when registration information reserved for use is to be erased, it can be erased without hampering the execution of a communication job and executing an erasing operation anew, so that the operability of the device can be improved. This advantage applies to other erasing operations. It will be appreciated that another setting can be made for accepting, a selection on whether respective registration information reserved for use is erased or not at step S33 when a plurality of reserved registration information is included in an erasing instruction object in the processes shown in FIG. 8 or 9. Also, it is applicable to enable a user to make a choice of executing a communication job reserving registration information on the spot and subsequently erasing the reserved registration information when the user desire to erase the reserved registration information. There may be a case that some communication jobs can be executed at a time that is not scheduled to be, while the communication jobs are required to be executed. In such a case, allowing the above choice results in a quick execution of the erasing operation, which is preferable.

Fourth Embodiment

Figure 10:
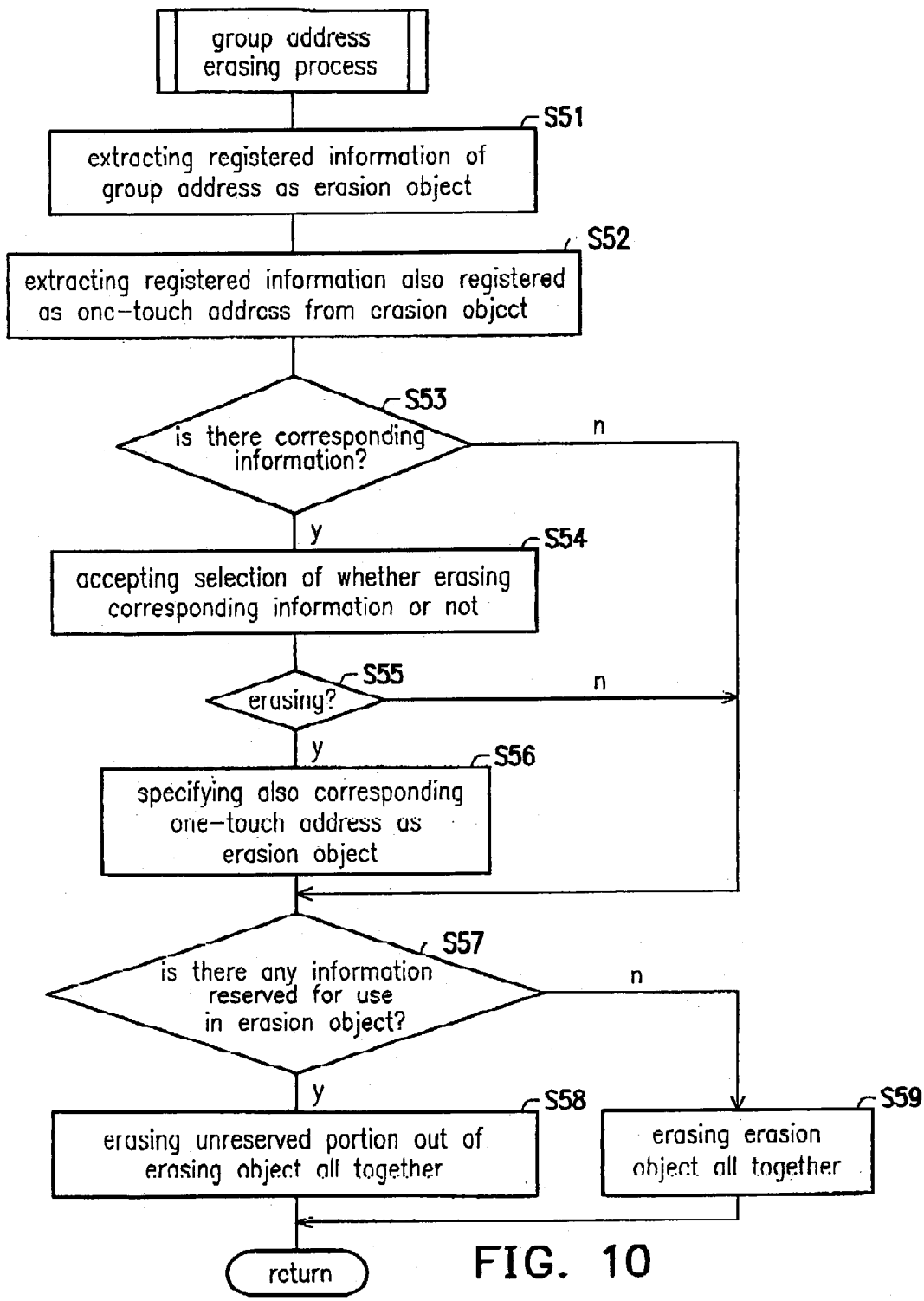
FIG. 10 is a flow chart showing part of the operation of the registration information erasing operation carried out in a facsimile, which is the fourth embodiment of the communication apparatus of the present invention.

Next, a description is made of the facsimile that is the fourth embodiment of the communication apparatus of the present invention. FIG. 10 is the flow chart showing part of the operation of the registration information erasing operation carried out in the facsimile, and FIG. 11 is the explanatory drawing for explaining the storing method of group address information for the facsimile. This facsimile is the same as the facsimile of the first embodiment, except that the erasing operation of registration information having each attribute is different from that of the first embodiment. Accordingly, the description not pertain to the difference of the erasing operation is omitted or simplified.

In this facsimile, as in the case of the first embodiment, when the total erasing instruction of registration information is selected, the system control section 17 executes the processes shown by the flow chart in FIG. 1. However, respective erasing operations of registration information group having each attribute are executed as the processes shown in FIG. 10, instead of being executed as the processes shown in FIG. 2 of the first embodiment. Here, the group address erasing operation is described as one example of such processes. The group address erasing operation is further represented by the flow chart in FIG. 10. First, at step S51, the information of a group address, which is the registration information group having an attribute selected as an erasing instruction object, is extracted as the erasing instruction object, wherein the system control section 17 functions as the extracting means.

It will be appreciated that, in this facsimile, the information of group address is recorded in the form of a matrix as shown in FIG. 11. A flag corresponding to a one-touch address, abbreviated address, temporary address or the like included in a group is set for each group and the flag indicates addresses which are the components of, each group. For example, the components of a group 001 shown in FIG. 11 are a one-touch address 000 and an abbreviated address 000, and the telephone numbers and addresses corresponding to them are the group address of the group 00. Therefore, part of the group address information is set by referring to the information of one-touch address and abbreviated address, thus, the group address information pertains to the information of one-touch address or abbreviated address. The temporary address is not related to the one-touch address or abbreviated address but is set by a direct input so that each temporary address is the component of one group only. Accordingly, when the information of group address recorded as described above is to be erased, the flags include in each group for indicating address and the temporary address information included in the group are extracted.

At step S52, as the related registration information that is to be erased simultaneously upon erasing the group address information, information also registered as one-touch address is extracted from the registration information of group address included in an erasing instruction object. For this process, the system control section 17 function is as the related information extracting means, which can execute the extraction process using the flag indicating the components of each group, as in the example shown in FIG. 11. It will be appreciated that, while only the one-touch address information is extracted at this step, it does not mean that the one-touch address only pertains to the group address information.

At the following step S53, whether any registration information is extracted at step S52 or not is determined. If extracted, step S54 follows, where a selection on whether the extracted registration information is to be also erased or not is accepted. At this time, the extracted information is displayed for allowing a user to make the selection. When the selection is made, step S55 follows, where the user determines whether to execute the erasing instruction or not. When the erasing instruction is to be made, step S56 follows, where the registration information of one-touch address that has been extracted at step S52 is also specified as an erasing instruction object, then the process proceeds to step 57. The processes of step S57 and S59 are the same as that of the steps S22 and S24 shown in FIG. 2, which are described in the first embodiment, so that a further description is omitted. When it is determined at step S53 that no extraction of registration information has occurred at step S52, or no erasing instruction is carried out at step S55, the process proceeds directly to step S57.

It is described here as one example that, as the related registration information that is to be erased simultaneously upon erasing the group address information, information also registered as one-touch address is extracted from the registration information of group address included in an erasing instruction object. However, the extraction of related information can also be made from abbreviated address and the like. It is also arranged in such a way that, when a plurality of the related registration information is extracted, a selection is accepted at step S54 on whether to erase or not each extracted information. While the group address erasing operation is closely described here, other erasing operations are equal to the group address erasing operation, except that registration information extracted at step S52 and the extraction range of related registration information to be simultaneously erased are different from that of the group address easing process. Therefore, further explanation of the other erasing operations is omitted. It will be appreciated that the extraction range of related registration information is set according to each attribute of registration information required to be erased.

According to a communication apparatus executing the above processes, a plurality of related registration information each having different attribute can be erased case by case by allowing a user to execute an interactive process. Therefore, an occasion of failing to erase secret information can be reduced and the operability of the device can be improved. It will be appreciated that the types of related information are not limited to the combination described above and the pattern of relation between information is not limited to the referential relation mentioned above. Besides, if the processes of step S57 and S59 shown in FIG. 10 are replaced with the processes of step S22 and S26 shown in FIG. 8, or with the processes of step S32 and S37 shown in FIG. 9, respectively, the effects described in the second or third embodiment can be obtained, in addition to the effect achieved in this embodiment.

Fifth Embodiment

Figure 12:
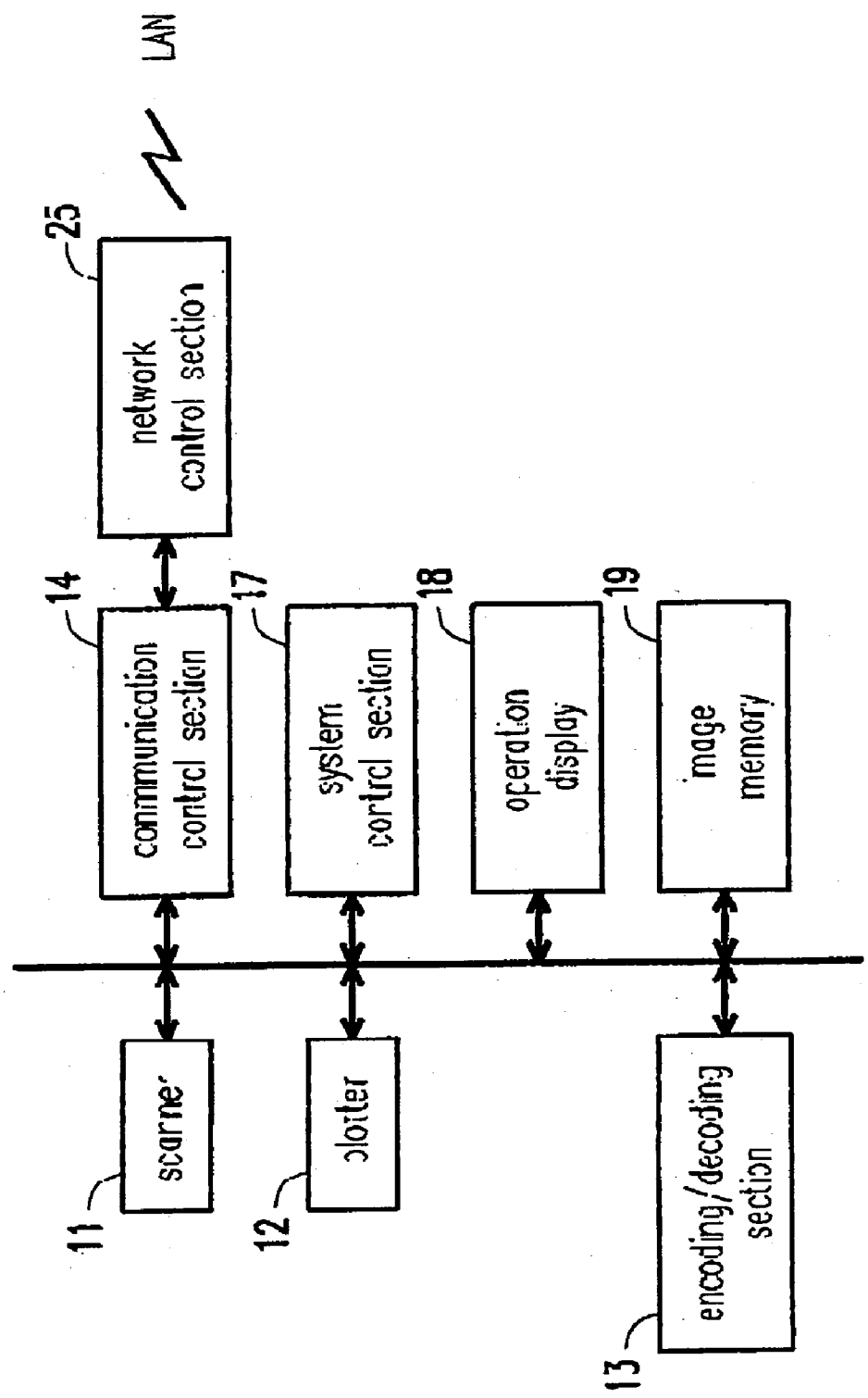
FIG. 12 is a block diagram showing the constitution of a facsimile, which is the fifth embodiment of the communication apparatus of the present invention.
Figure 13:
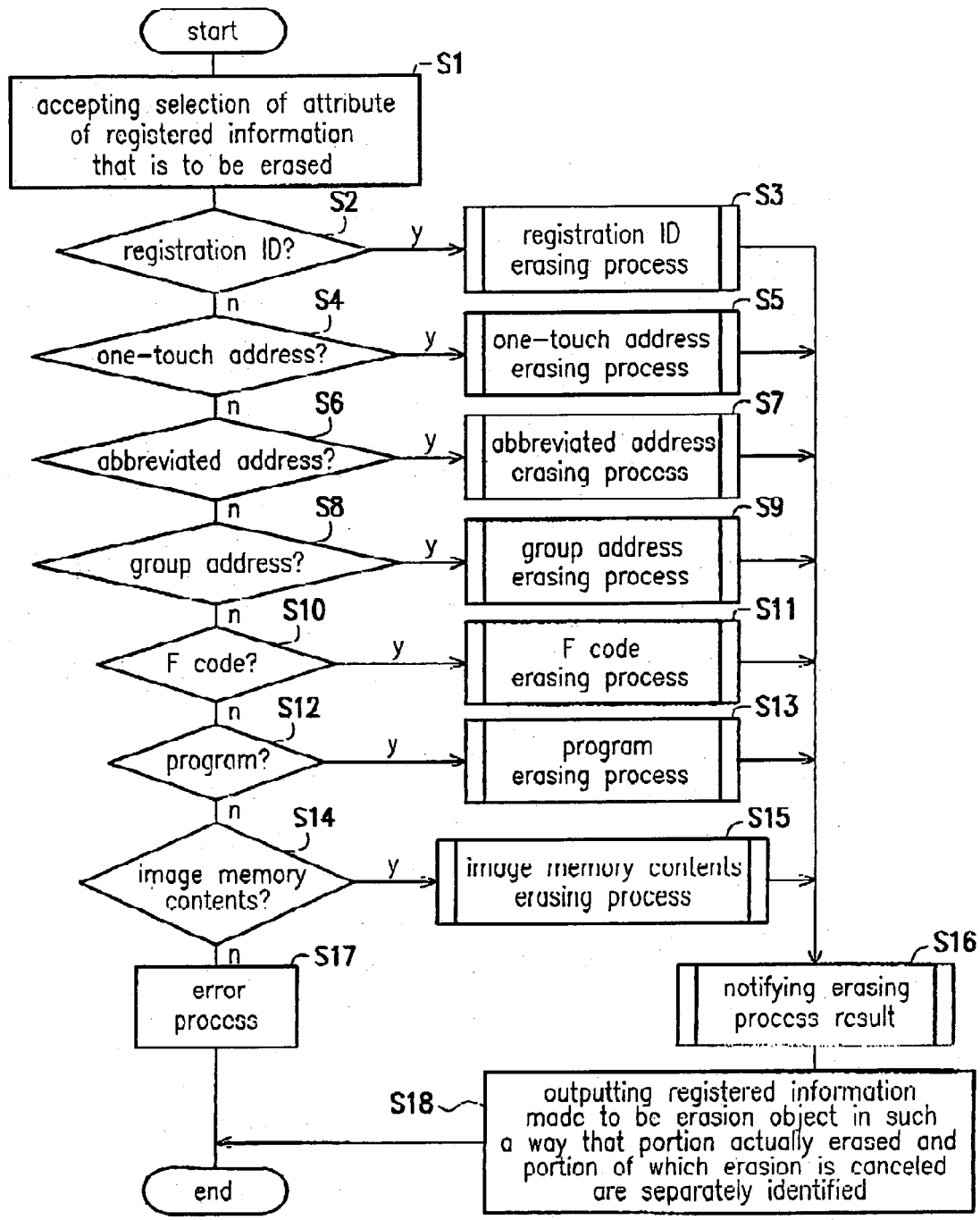
FIG. 13 is a flow chart showing the operation of the registration information erasing operation carried out in the facsimile of the fifth embodiment.
Figure 14:
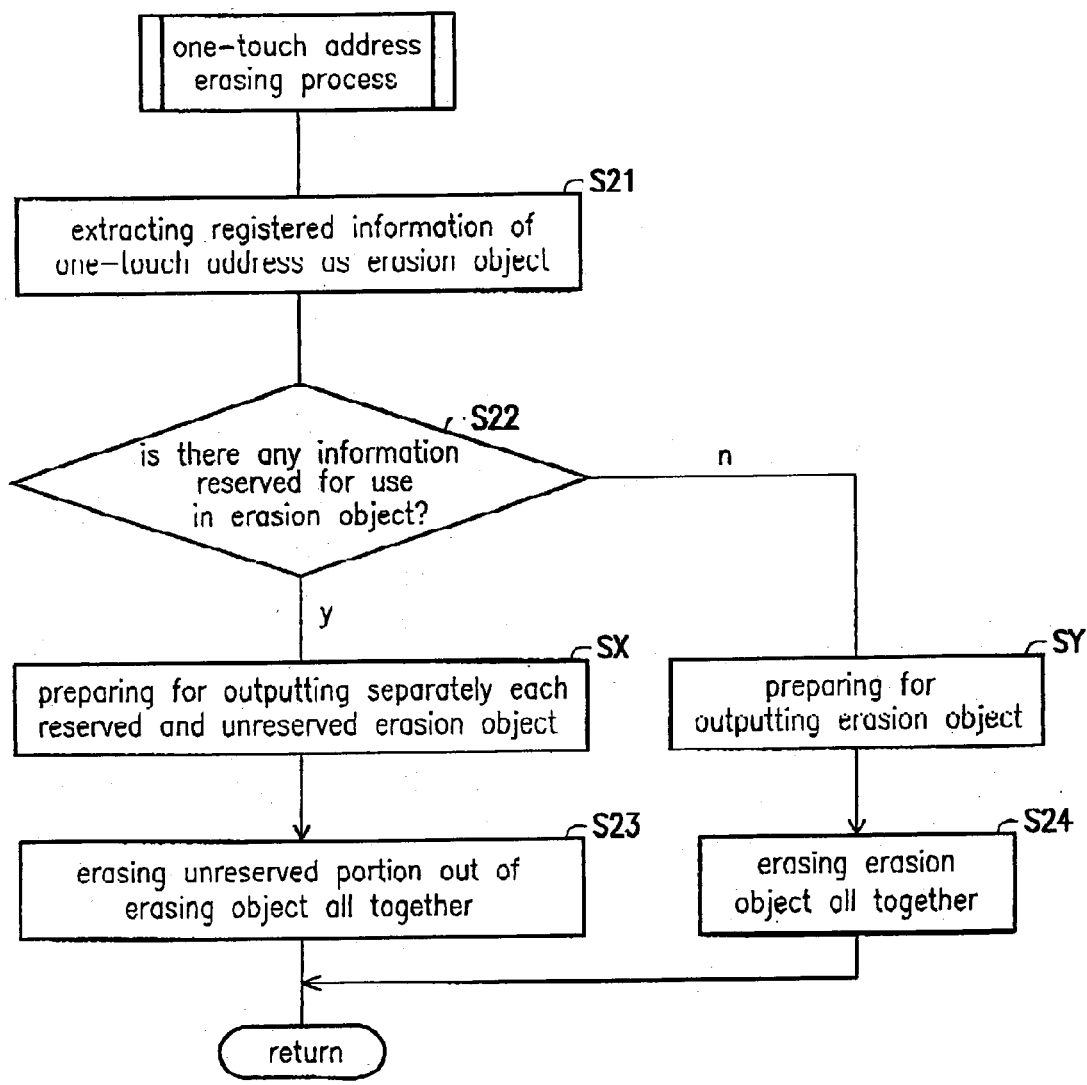
FIG. 14 is a flow chart showing the details of the partial operation of the facsimile of the fifth embodiment.

Next, a description is made of the facsimile that is the fifth embodiment of the communication apparatus of the present invention. FIG. 12 is the block diagram showing the constitution of the facsimile, FIG. 13 is the flow chart showing the operation of the registration information erasing operation carried out in the facsimile, and FIG. 14 is the flow chart showing the details of the partial operation of the facsimile. The part common to this facsimile and the facsimile of the first embodiment is omitted from the following description.

This facsimile, as shown in FIG. 12, is provided with a network control section 25, which replaces the modem 15 and the NCU 16 of the facsimile of the first embodiment. This facsimile is a network facsimile connected to a LAN (Local Area Network) via the network control section 25 and is capable of communicating with other apparatuses via the LAN or the Internet the facsimile accesses through a server connected via the LAN. Image information is exchanged as e-mail files and information exchange with the facsimile that is not connected to the network is carried out via a gateway unit. Besides, in the facsimile, a communication destination can be specified not only by a telephone number, but also by an IP (Internet Protocol) address, e-mail address or the like. These address information can also be registered as one-touch addresses or abbreviated addresses, therefore, also included in address information or registration information. The other constitutional elements of the facsimile are the same as that of the facsimile of the first embodiment.

In this facsimile, when the total erasing instruction of registration information is selected, the system control section 17 start executing the processes shown by the flow chart in FIG. 13. While the processes are almost identical to that of the first embodiment, which is described using FIG. 1, respective erasing operations of registration information belonging to each attribute, which is shown in FIG. 3, 5, etc., are not the same. Also, different from the processes of first embodiment, the process of step S18 ensues that of step S16 in this processes. Accordingly, the erasing operation of registration information group having each attribute is described using the one-touch address erasing operation shown by step S5 as one example.

The one-touch address erasing operation in this embodiment is further represented by the flow chart shown in FIG. 14. Since the processes of step S21 and S22 are the same one described in the first embodiment using FIG. 2, the further description of those processes is omitted. When any erasing instruction object reserved for use is found at step S22, step SX follows, where a preparation is made for outputting separately the reserved erasing instruction object and non-reserved erasing instruction object. Since the reserved one is not erased at step S23, the erasing instruction object can be sorted into a portion that is actually erased and into a portion of which the erasing instruction is canceled, according to the existence or non-existence of reservation for use. The output of the erasing instruction object here means a printout, forming an image on a sheet using the plotter 12, as described later. To prepare the output, necessary data is prepared and is recorded in the RAM installed in the system control section 17. It is optional to create printout data or image data at this point, or to make a setting for temporary storing the registration information required to be output so that the necessary data can be created later. The output is carried out for all or prescribed items of registration information, including one-touch number, address, address information.

Following step SX, unreserved portion of the erasing instruction object is totally erased at step S23, as in the case of the first embodiment, and the processes returns to the process before the one-touch address erasing operation. Meanwhile, if no reserved erasing instruction object is found at step S22, step SY follows, where a preparation for outputting the erasing instruction object is made. Since the whole registration information made as erasing instruction object is actually erased, sorting out the erasing instruction object is not necessary. The contents of the preparation are same as that of step SX. Following step SY, step S24 follows, where the erasing instruction object is erased all together. Then, the process returns to the process before the one-touch address erasing operation. While the one-touch address erasing operation is closely described here, other respective erasing operations are equal to the one-touch address erasing operation, except that extracted each registration information is different at step S21 and the contents of the data prepared at step SX or SY are different according to the attribute of registration information group. Therefore, further explanation of the other erasing operations is omitted.

Next, the process of step S18 is described. At this step, registration information made to be an erasing instruction object is output in such a way that a portion actually erased and a portion of which the erasing instruction is canceled can be separately identified. While the output can be made as a display on the operation display 18 or through transmitting data to an external apparatus, it is made as an image formed on a sheet with the plotter 12. The output can be made using the data prepared at step SX or SY, as shown in FIG. 14, which represents the one-touch address erasing operation described as an example. As for a pattern of the output, i.e., pattern of printout, it is not necessary to print out the actually erased portion and the erasing instruction-cancelled portion in separated positions as far as both portions are separately identified by marking and the like. It will be appreciated that such a printout may be carried out when the data is prepared at step SX or SY, instead of being carried out at step S18. According to the communication apparatus executing the above processes, a use can easily recognize information that has been actually erased and information that has been maintained simultaneously when the user execute the total erasing instruction of registration information. It facilitates the user to make a judgment if the user should carry out an additional erasing operation, so that the operability of the device can be improved.

Sixth Embodiment

Figure 15:
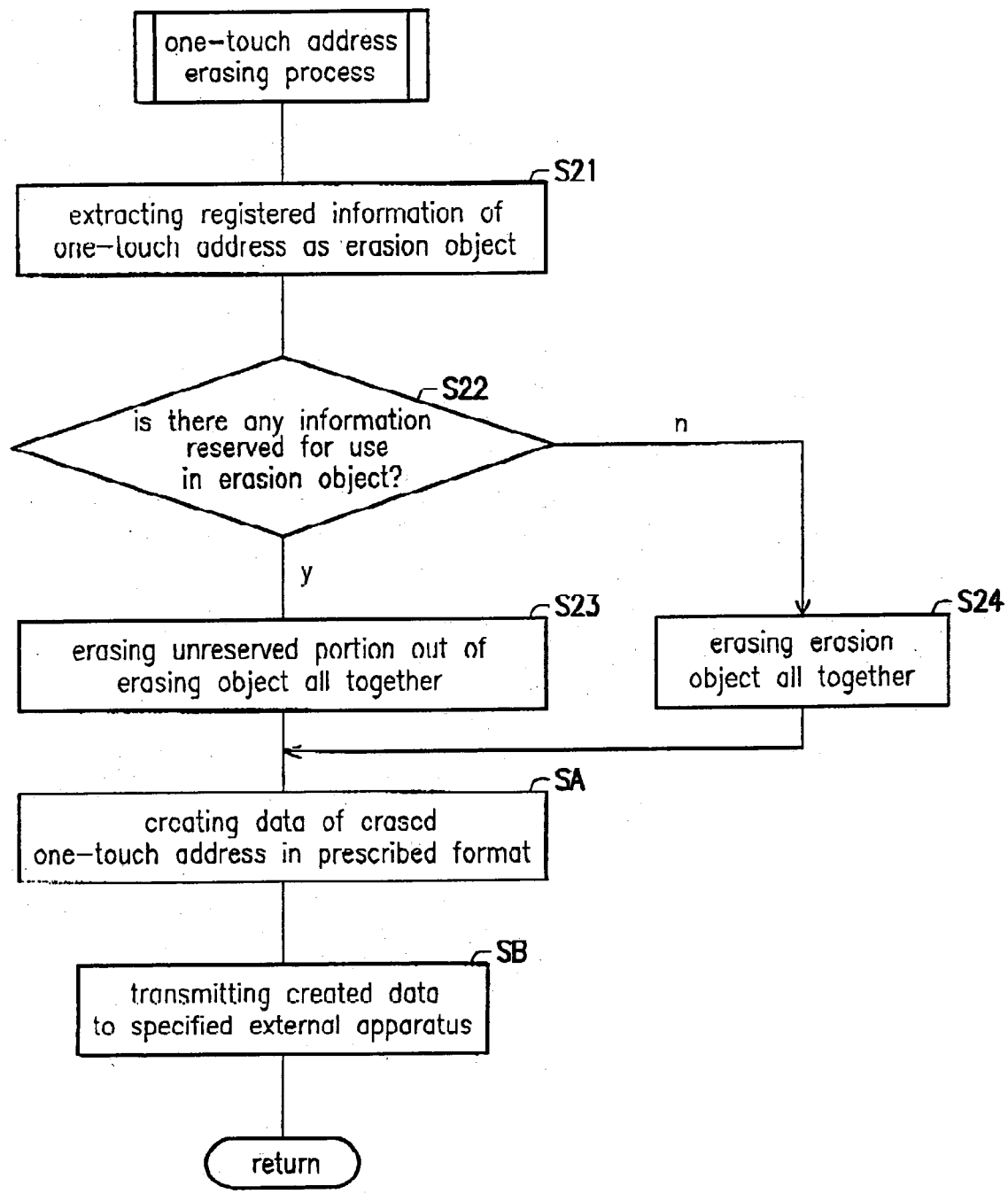
FIG. 15 is a flow chart showing part of the operation of the registration information erasing operation carried out in a facsimile, which is the sixth embodiment of the communication apparatus of the present invention.
Figure 16:
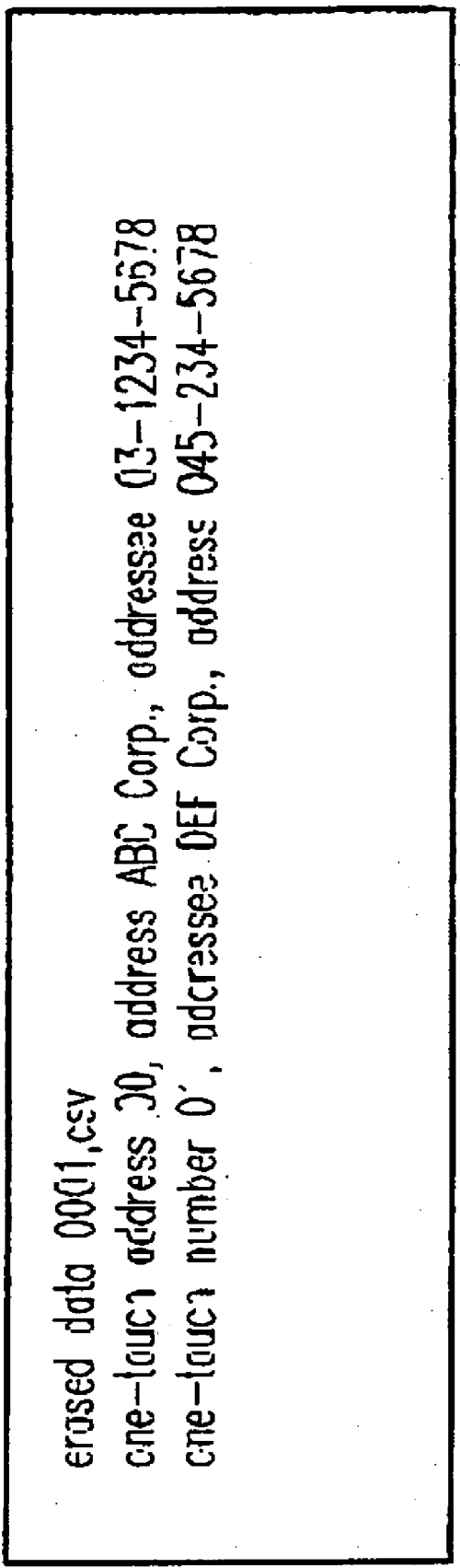
FIG. 16 is a drawing showing an example of a format employed upon outputting erased registration information to an external apparatus.
Figure 17:
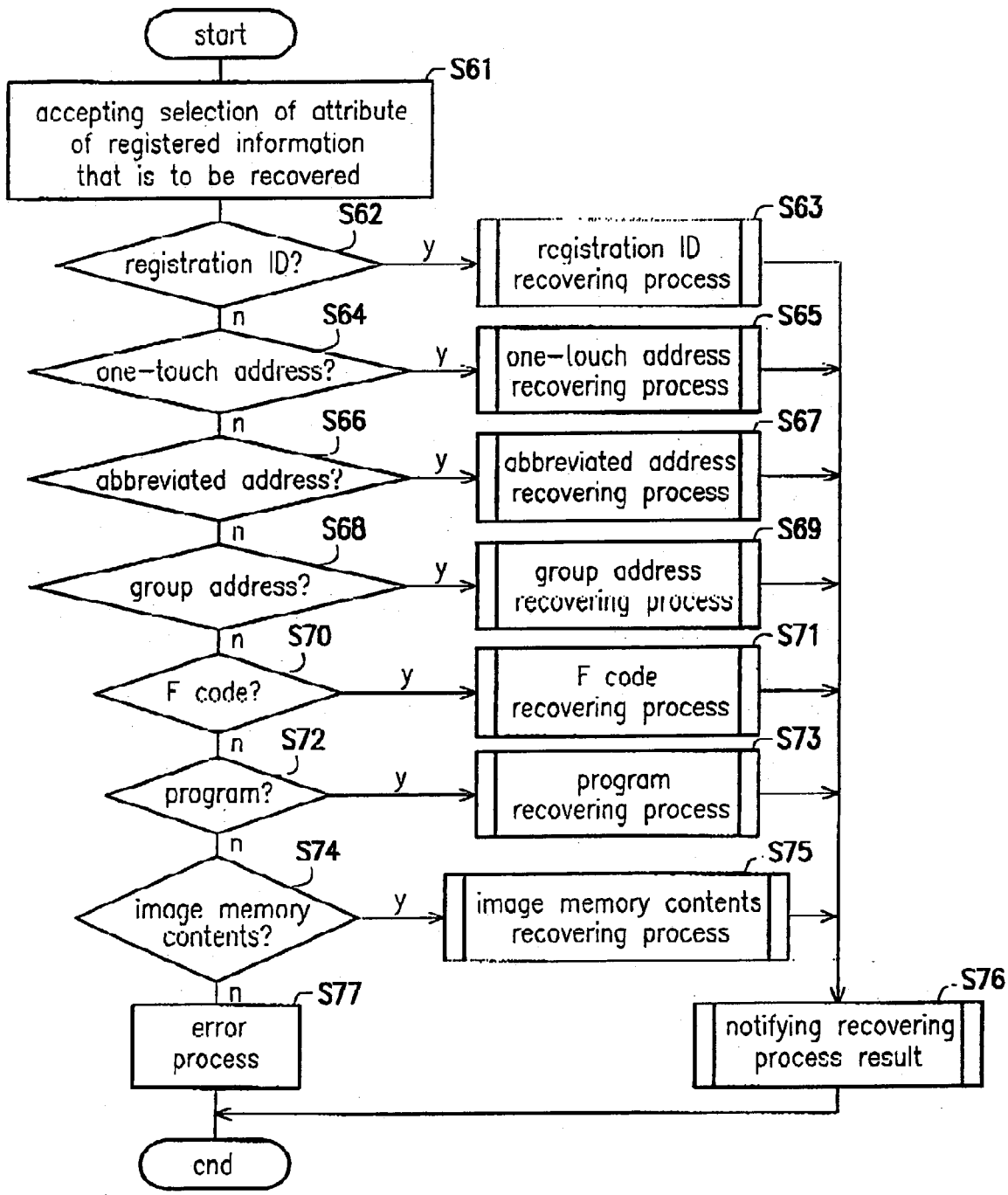
FIG. 17 is a flow chart showing the operation of a registration information recovering process carried out in the facsimile that is the sixth embodiment of the communication apparatus of the present invention.
Figure 18:
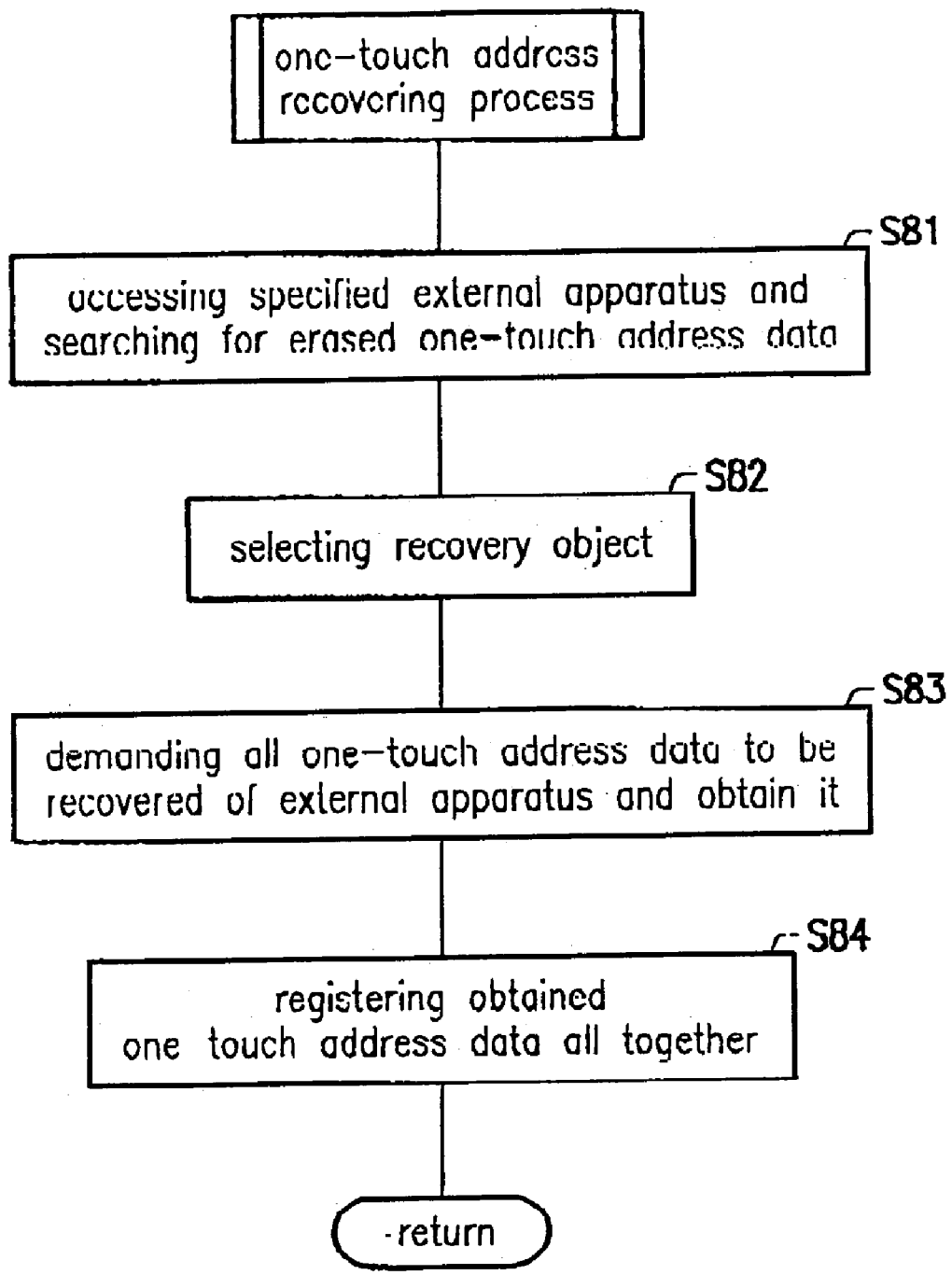
FIG. 18 is a flow chart showing the details of the partial operation of the registration information recovering process of the sixth embodiment.
Figure 19:
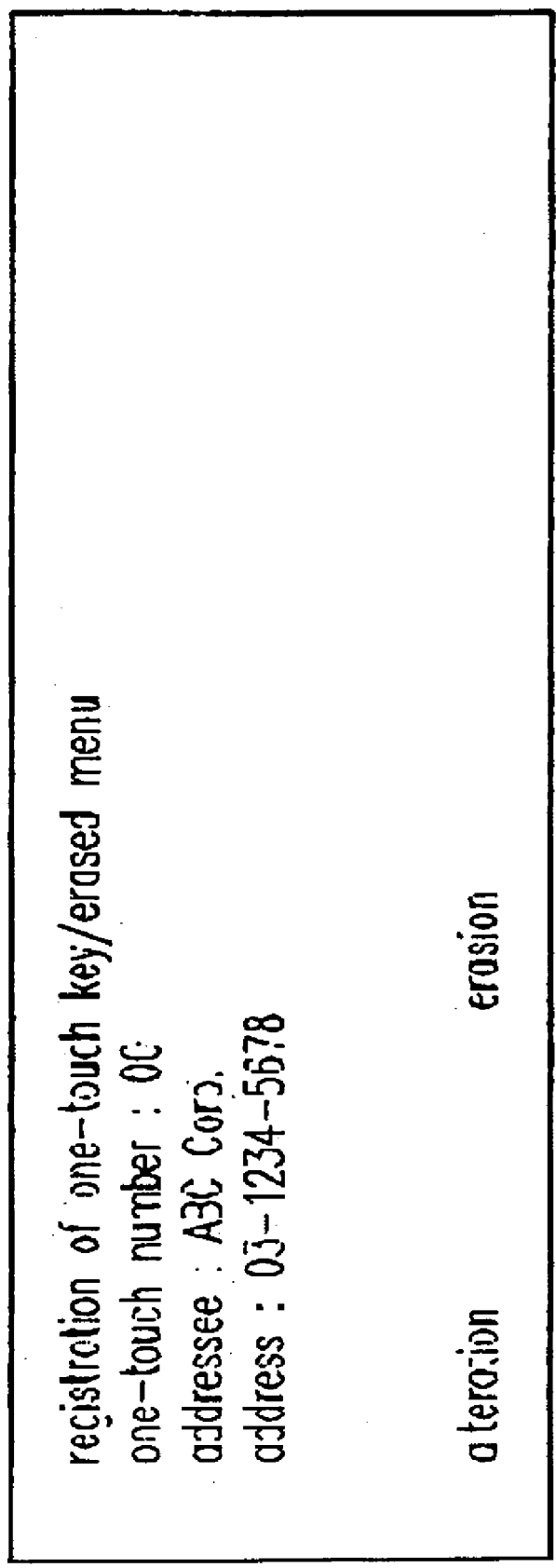
FIG. 19 is a drawing showing an example of a screen appearing on the display of a conventional facsimile when information linked to a one-touch key is registered, erased or altered.

Next, a description is made of the facsimile that is the sixth embodiment of the communication apparatus of the present invention. FIG. 15 is the flow chart showing part of the operation of the registration information erasing operation carried out in the facsimile, FIG. 16 is the drawing showing an example of a format employed upon outputting erased registration information to an external apparatus, FIG. 17 is the flow chart showing the operation of the registration information recovering process carried out in the facsimile, and FIG. 18 is the flow chart showing the details of the partial operation of the registration information recovering process.

This facsimile is a network facsimile having a hardware configuration same as that of the facsimile of the fifth embodiment. In this facsimile, as in the case of the first embodiment, when the total erasing instruction of registration information is selected, the system control section 17 executes the processes shown by the flow chart in FIG. 1. However, respective erasing operations of registration information group having each attribute are executed as the processes shown in FIG. 15, instead of being executed as the processes shown in FIG. 2 of the first embodiment. Here, the one-touch address erasing operation is also described as one example of such processes.

The one-touch address erasing operation executed in this embodiment is further represented by the flow chart shown in FIG. 15. Since the processes of step S21 and S22 are the same one described in the first embodiment using FIG. 2, the further description of those processes is omitted. Likewise, the processes of step S23 and S24 are also similar to that of the first embodiment. In this embodiment, however, the contents of erased registration information are temporary recorded in the RAM of the system control section 17 so as to be subjected to the process of step SA when the total erasing instruction of registration information is carried out. After the process of step S23 or S24 is over, step SA follows, where the data of one-touch address, which is the registration information erased at step S23 or S24, is created in a prescribed format. The format should be such a one that it can allow an external apparatus, a transmission destination at Step SB, to identify the contents of formatted data as the erased registration information. Therefore, as far as the external apparatus is provided with an identifying function, such a display that each data following a header and separated by commas is arranged in a row will suffice, as shown in FIG. 16. While an example of data containing one-touch numbers, addressees, and addresses is shown in FIG. 16, if other information is also registered so as able to reconstruct erased registration information later, the information is also included in the data created at step SA.

At step SB, the data created at step SA is transmitted to a specified external apparatus. While a transmission destination may be specified at this point, it is specified beforehand in this case. The specification can be made using an e-mail address and the like, where data transmission can be made as e-mail transmission, as in the case of transmitting image information. A PC (Personal Computer), a data server or the like can be employed as the external apparatus. The external apparatus must have a function for storing and managing received data, which is transmitted by the process of step SB, as the erased registration information of the network facsimile by executing a required application program. It is recommended to make the external apparatus capable of managing also the identifying information of the facsimile erasing registration information, the date of erasing instruction and the like. After step SB is over, the one-touch address erasing operation is ended to return to the previous process.

While the one-touch address erasing operation is closely described here, other respective erasing operations are equal to the one-touch address erasing operation, except that extracted each registration information is different at step S21, which makes the contents of data created at step SA different accordingly. Therefore, further explanation of the other erasing operations is omitted. According to a communication apparatus executing the processes as described above, erased registration information can be managed in an external apparatus so that the registration information can be referred to even after its erasing instruction. Besides, when a user happens to erase registration information by executing a wrong operation, the information of such an erasing instruction can be kept in the external apparatus, so that the operability of the device can be improved.

In the facsimile of this embodiment, registration information once erased can be recovered. Such a registration information recovering process is described next. When the recovery of registration information is selected in the facsimile, the system control section 17 start executing the process shown by the flow chart in FIG. 17. First, at step S61, the selection of the attribute of registration information that is to be recovered is accepted. The acceptance can be executed, as in the case of step S1 in FIG. 1, by displaying a prescribed message on the operation display 18 to prompt a user to make a selection. Here, the same attributes used in the case of erasing instruction are used as attributes of the registration information to be recovered.

When the selection is accepted at step S61, step S62 follows, where whether a selected attribute is a registration ID or not is determined. If it is the registration ID, step S63 follows, where the registered ID recovering process is executed to recover the information of the registration ID. Then, step S76 follows, where a result of the recovering process is notified to the user and the registration information recovering process ends. The notification is made, for example, by displaying a message on the operation display 18, or by printing out a report on the plotter 12.

When the selected attribute is not a registration ID at step S62, step S64 follows, where the selected attribute is a one-touch address or not is determined. If it is the one-touch address, step S65 follows, where the one-touch address recovery process is executed to recover the information of one-touch address. Then, step S76 follows, where a result of the recovery process is notified to the user and the registration information recovery process ends. When the selected attribute is not a one-touch address at step S64, step S66 follows. Likewise, whether the selected attribute is an abbreviated address, group address, F-code, program, or the contents of image memory, is determined in order at respective steps. At each step, upon finding that the selected attribute is one of those, the recovering process of the registration information having the attribute is carried out. Then, at step S67, a result of the recovering process is notified to the user and the whole steps ends. When the selected attribute does not belong to any above attributes, no expected attribute has been selected. Such a case is regarded as the case that a normal selection has not been carried out, which is followed by step S77, where an error process is carried out to end the whole steps.

Next, respective recovering processes of the registration information having each attribute, as shown by step S63, S65, etc., in FIG. 17, are to be described in detail. Here, the one-touch address recovering process shown by step S65 is described as an example. The one-touch address recovering process is further represented by the flow chart in FIG. 18. At step S81, a user accesses a specified external apparatus and searches for one-touch address data previously erased from the facsimile. While the external apparatus may be specified at this point, it is specified beforehand in this case. The specification can be made using an e-mail address and the like, where the same specification as made at step SB in FIG. 15 is made. That is, it is specified the external apparatus, which is rendered to be the transmission destination of the data of registration information erased upon executing the registration information erasing operation. To check a result of the above search, the user can either demand an e-mail transmission from the external apparatus or check the result while accessing the apparatus.

At following step S82, data to be recovered is selected from the erased one-touch address data stored in the external apparatus. The selection can be made automatically, for example, through selecting a data erased from the facsimile, or by the user who checks the search result displayed on the operation display. After the selection, step S83 follows, where the transmission of all the one-touch address data to be recovered is demanded of the external apparatus and the data is obtained. For this process, the external apparatus is provided with a function allowing the apparatus to transmit the demanded one-touch address data as an e-mail file in response to the demand from the facsimile, and the facsimile obtains a necessary data by receiving the transmission.

Then, at step S84, the facsimile registers the obtained one-touch address data all together as its own one-touch address to restore the original one-touch address and the process returns to the stage before the one-touch address recovery process. When an existing one-touch address is to be overwritten upon the above registration, it may be arranged in such a way that the existing address is not registered, or a confirmation request on whether the registration is allowable or not is made for a user, or the registration is made by automatically searching for an unused number. While the one-touch address recovering process is closely described here, other respective recovering processes are equal to the one-touch address recovering process, except that registration information is different at step S81 where the information is searched for, at step S83 where the information is demanded of an external apparatus, and at step S84 where total registration of the information is made, respectively. Therefore, further explanation of the other recovery processes is omitted.

It will be appreciated that, while the recovery of registration information is carried out per each attribute all together, it is applicable to make an arrangement enabling an individual selection of each registration information for recovery. According to a communication apparatus executing the above processes, registration information can be easily erased or recovered so that the operability of the device can be improved. Also, if an arrangement is made to enable the device to obtain and record registration information different from the one transmitted to an external apparatus upon erasing the information when the recovery of registration information is carried out, registration information can be easily replaced with desired one. As a result, one device can be used for a variety of purposes, which also improve the operability of the device.

It will be appreciated that, while the description of the present invention is given only for a facsimile connected to the PSTN in the above first to fourth embodiments, it is obvious that the invention can be applied to a facsimile connected to a network, such as the Internet and the like, as described in the five and sixth embodiments, wherein an IP address, mail address, password, etc., are also included in registration information. Besides, the fifth and sixth embodiments can be applied to the facsimile connected to the PSTN as far as the facsimile can also be connect to a network. Further, when the present invention is applied to the network-connected facsimile, the first to fourth embodiments and the fifth to sixth embodiments are applied to the facsimile in combination. Also, the invention can be applied to other communication apparatus including cellular phones, PC with communication functions, and digital composite equipment and the like if they are devices having memory means for storing registration information which is registered individually by a user per a apparatus or a user. Furthermore, the invention can also be applied to other electronic devices including image forming devices, electric appliances equipped with a microcomputer if they are devices having such memory means as described above.

The program of this invention is a program for making a computer controlling a communication apparatus, such as the above each facsimile, execute the processes shown by the flow charts in each embodiment so that the computer functions as aforementioned each means. By making the computer execute the above program, the computer functions as the above each means to obtain the effects described heretofore. Such a program may be pre-stored in the computer or a memory means, such as ROM or HDD (Hard Disk Drive) installed in the communication apparatus, but can also be recorded in a nonvolatile storing medium (memory), such as CD-ROM, flexible disk, SRAM, EEPROM (Electrically Erasable Programmable Read-Only Memory), memory card, etc. for use. The program recorded in the memory, i.e., nonvolatile storing medium, is installed in the computer to be executed by the CPU of the computer, or read out from the memory and executed by the CPU. In this manner, the above each procedure, i.e., each means, is executed. Further, when the computer or communication apparatus has a proper means, it is possible to connect the computer or device to a network so that it downloads the program from an external apparatus having a storing medium or a storing means storing the program and executes the program.

According to the communication apparatus and the control method of the same provided by the present invention, as described heretofore, respective registration information in the device can be totally erased for every selected type of information according to the disposal, transfer, assignment, etc., of the device. Therefore, the operability of the device can be improved for the management of the registration information in the device. Besides, registration information reserved for use is not erased so that such an accident can be prevented that other user has happened to erase the reserved registration information. In this manner, the erasing operation can be carried out without hampering business operations. Also, according to the program of the present invention, the above effect can be obtained by making a computer control the communication apparatus. Further, according to the storing medium of the invention, the above effect can be obtained by making a computer without storing the above program store and execute the program.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

This application claims the priority benefit of Japanese application serial no.2002-033007, filed on Feb. 8, 2002, serial no. 2002-274446, filed on Sep. 20, 2002, and serial no. 2002-339776, filed on Nov. 22, 2002.

What is claimed is:

1. A communication apparatus, comprising: first storing means for storing registration information including registration information groups identified by a plurality of attributes; first accepting means for accepting a selection of an attribute of a registration information group required to be erased; first extracting means for extracting information of said registration information group having said attribute the selection of which is accepted by said first accepting means; first erasing means for erasing the information of said registration information group extracted by said first extracting means; and determining means for determining as to whether the registration information group required to be erased includes information reserved for use in a communication job when said erasing means executes an erasing operation, wherein said first erasing means erases at one time the information of the registration information group extracted by said first extracting means when said determining means determines as that the information of said registration information group required to be erased does not include information reserved for use in a communication job, and said first erasing means erases at one time the information of the registration information group extracted by said first extracting means, excluding said information reserved for use in a communication job, when said determining means determines as that the information of said registration information group required to be erased includes information reserved for use in the communication job.

2. The communication apparatus of claim 1, wherein said registration information stored in said first storing means includes at least one of telephone numbers, names, addresses, communication capabilities relating to said communication apparatus and other communication apparatuses, and said plurality attributes include attributes of a registration identification, a one-touch address, an abbreviation address, a group address, an F-code, a program, and an image memory content.

3. The communication apparatus of claim 1, further comprising notifying means for notifying a user of an execution result of the erasing operation after said first erasing means has executed the erasing operation.

4. The communication apparatus of claim 1, further comprising:
    second storing means for storing history information including a plurality of history information elements indicative of communication job histories performed by said communication apparatus;
    searching, means for searching a history information using registration information group erased by said first erasing means; and
    second erasing means for erasing said history information element searched by said searching means.

5. The communication apparatus of claim 1, further comprising:
    second accepting means for accepting a selection between erasing and non-erasing instructions with respect to the information of the registration group required to be erased when said determining means determines as that the information of the registration information required to be erased includes information reserved for use in a communication job; and
    canceling means for canceling the communication job when said second accepting means accepts the selection of the erasing instruction,
    wherein said first erasing means erases at one time the information of said registration information group including said information reserved for use in the communication job after said canceling means cancels the communication job scheduled to use said information reserved.

6. Tile communication apparatus of claim 1, further comprising:
third accepting means for accepting a selection between erasing and non-erasing instructions with respect to the information of said registration information group required to be erased when said determining means determines as that the information of said registration information group required to be erased includes information reserved for use in a communication job;
wherein said first erasing means erases at one time the information of said registration information group including said information reserved for use in the communication job after a completion of said communication job scheduled to use said information reserved, when said third accepting means accepts the selection of the erasing instruction.

7. The communication apparatus of claim 1, further comprising:
second extracting means for extracting common information included in the registration information group required to be erased and in another registration information group having another attribute; and
fourth accepting means for accepting a selection between erasing and non-erasing instructions with respect to said common information extracted when said second extracting means has extracted common information,
wherein said first erasing means erases at one time the information of said registration information group required to be erased and the common information extracted by said second extracting means when said fourth means accepts the selection of the erasing instruction.

8. The communication apparatus of claim 1, further comprising outputting means for outputting the information of said registration information group required to be erased in a way such that information actually erased and information saved from the erasing instruction are distinguished from each other when said first erasing means erases said registration information group.

9. The communication apparatus of claim 1, further comprising transmitting means for transmitting the information of said registration information group erased by said erasing means to an external apparatus in a format allowing said external apparatus to recognize the information as the information erased when said first erasing means erases the information of said registration information group.

10. The communication apparatus of claim 9, further comprising:
fifth accepting means for accepting an information recovering instruction for recovering the information of said registration information group erased by said first erasing means; and
obtaining means for obtaining data of the information of said registration information group required to be recovered from said external apparatus when said fifth accepting means accepts said information recovering.

11. A communication controlling method, comprising the steps of:
storing registration information including registration information groups identified by a plurality of attributes;
accepting a selection of an attribute of a registration information group required to be erased;
extracting information of said registration information group having said attribute of which said selection is accepted;
determining, as to whether the registration information required to be erased includes information reserved for use in a communication job at a time of an erasing operation relative to the information of the registration information group required to be erased;
erasing at one time the information of said registration information group when the information of said registration information group required to be erased is determined in the determining step as not including information reserved for use in a communication job; and
erasing, at one time the information of said registration information group required to be erased, excluding said information reserved for use in the communication job when the information of said registration information group required to be erased is determined by the determining step as including the information reserved for use in the communication job.

12. The communication controlling method of claim 11, wherein said registration information stored in said first storing means includes at least one of telephone numbers, names, addresses, communication capabilities relating to said communication apparatus and other communication apparatuses, and said plurality attributes include attributes of a registration identification, a one-touch address, an abbreviation address, a group address, an F-code, a program, and an image memory content.

13. A computer readable recording medium storing a program prepared for a computer controlling a communication apparatus, which comprises: storing means for storing registration information including registration information group identified by a plurality of attributes; accepting means for accepting a selection of an attribute of a registration information group required to be erased; extracting means for extracting information of said registration information group having said attribute the selection of which is accepted by said accepting means; erasing means for erasing the information of said registration information group extracted by said extracting means; and determining means for determining as to whether the registration information group required to be erased includes information reserved for use in a communication job when said erasing means executes an erasing operation, wherein said erasing means erases at one time the information extracted by said extracting means when said determining means determines as that said registration information group required to be erased does not include information reserved for use in a communication job, and said erasing means erases at one time the information of said registration information group required to be erased, excluding said information reserved for use in a communication job, when said determining means determines as that the information of said registration information group extracted by the extracting means includes the information reserved for use in the communication job.

14. The program of claim 13, wherein said registration information stored in said first storing means includes at least one of telephone numbers, names, addresses, communication capabilities relating to said communication apparatus and other communication apparatuses, and said plurality attributes include attributes of a registration identification, a one-touch address, an abbreviation address, a group address, an F-code, a program, and an image memory content.

15. A communication apparatus, comprising:
a first storing mechanism configured to store registration information including registration information groups identified by a plurality of attributes;

a first accepting mechanism configured to accept a selection of an attribute of a registration information group required to be erased;

a first extracting mechanism configured to extract information of said registration information group having said attribute the selection of which is accepted by said first accepting mechanism;

a first erasing mechanism configured to erase the information of said registration information group extracted by said first extracting mechanism; and a determining mechanism configured to determining as to whether the registration information group required to be erased includes information reserved for use in a communication job when said erasing mechanism executes an erasing operation, wherein said first erasing mechanism erases at one time the information of the registration information group extracted by said first extracting mechanism when said determining mechanism determines as that the information of said registration information group required to be erased does not includes information reserved for use in a communication job, and said first erasing mechanism erases at one time the information of the registration information group extracted by said first extracting mechanism, excluding said information reserved for use in a communication job, when said determining mechanism determines as that the information of said registration information group required to be erased includes information reserved for use in the communication job.

16. The communication apparatus of claim 15, wherein said registration information stored in said first storing mechanism includes at least one of telephone numbers, names, addresses, communication capabilities relating to said communication apparatus and other communication apparatuses, and said plurality attributes include attributes of a registration identification, a one-touch address, an abbreviation address, a group address, an F-code, a program, and an image memory content.

17. The communication apparatus of claim 15, further comprising a notifying mechanism configured to notify a user of an execution result of the erasing operation after said first erasing mechanism has executed the erasing operation.

18. The communication apparatus of claim 15, further comprising:
a second storing mechanism configured to storing history information including a plurality of history information elements indicative of communication job histories performed by said communication apparatus;
a searching mechanism configured to searching a history information using registration information group erased by said first erasing mechanism; and
a second erasing mechanism configured to erasing said history information element searched by said searching mechanism.

19. The communication apparatus of claim 15, further comprising:
a second accepting mechanism configured to accepting a selection between erasing and non-erasing instructions with respect to the information of the registration group required to be erased when said determining mechanism determines as that the information of the registration information required to be erased includes information reserved for use in a communication job; and
a canceling mechanism configured to canceling the communication job when said second accepting mechanism accepts the selection of the erasing instruction,
wherein said first erasing mechanism erases at one time the information of said registration information group including said information reserved for use in the communication job after said canceling mechanism cancels the communication job scheduled to use said information reserved.

20. The communication apparatus of claim 15, further comprising:
a third accepting mechanism configured to accepting a selection between erasing and non-erasing instructions with respect to the information of said registration information group required to be erased when said determining mechanism determines as that the information of said registration information group required to be erased includes information reserved for use in a communication job;
wherein said first erasing mechanism erases at one time the information of said registration information group including said information reserved for use in the communication job after a completion of said communication job scheduled to use said information reserved, when said third accepting mechanism accepts the selection of the erasing instruction.

21. The communication apparatus of claim 15, further comprising:
a second extracting mechanism configured to extracting common information included in the registration information group required to be erased and in another registration information group having another attribute; and
a fourth accepting mechanism configured to accepting a selection between erasing and non-erasing instructions with respect to said common information extracted when said second extracting, mechanism has extracted common information,
wherein said first erasing mechanism erases at one time the information of said registration information group required to be erased and the common information extracted by said second extracting mechanism when said fourth mechanism accepts the selection of the erasing instruction.

22. The communication apparatus of claim 15, further comprising an outputting mechanism configured to outputting the information of said registration information group required to be erased in a way such that information actually erased and information saved from the erasing instruction are distinguished from each other when said first erasing mechanism erases said registration information group.

23. The communication apparatus of claim 15, further comprising a transmitting mechanism configured to transmitting the information of said registration information group erased by said erasing mechanism to an external apparatus in a format allowing said external apparatus to recognize the information as the information erased when said first erasing mechanism erases the information of said registration information group.

24. The communication apparatus of claim 23, further comprising:
a fifth accepting mechanism configured to accepting an information recovering instruction for recovering the information of said registration information group erased by said first erasing mechanism; and
an obtaining mechanism configured to obtaining data of the information of said registration information group required to be recovered from said external apparatus when said fifth accepting mechanism accepts said information recovering.

* * * * *

UNITED STATES PATENT AND TRADEMARK OFFICE
CERTIFICATE OF CORRECTION

PATENT NO. : 7,187,463 B2  Page 1 of 1
APPLICATION NO. : 10/361,129
DATED : March 6, 2007
INVENTOR(S) : Tetsuya Kagawa It is certified that error appears in the above-identified patent and that said Letters Patent is hereby corrected as shown below:

Title Page;
Replace the Title section (54) on the cover page of the patent, with the following:

--(54) ~~METHOD OF DETERMINING WHETHER REGISTRATION INFORMATION TO BE ERASED INCLUDES INFORMATION RESERVED FOR USE IN A COMMUNICATION JOB~~ COMMUNICATION APPARATUS, COMMUNICATION CONTROLLING METHOD AND PROGRAM, AND RECORDING MEDIUM FOR STORING THE PROGRAM --

Signed and Sealed this

Fifth Day of August, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,187,463 B2 | Page 1 of 1 |
| APPLICATION NO. | : 10/361,129 | |
| DATED | : March 6, 2007 | |
| INVENTOR(S) | : Tetsuya Kagawa | |

It is certified that error appears in the above-identified patent and that said Letters Patent is hereby corrected as shown below:

Title Page;
Replace the Title section (54) and Column 1, lines 1-5 on the cover page of the patent, with the following:

--(54) ~~METHOD OF DETERMINING WHETHER REGISTRATION INFORMATION TO BE ERASED INCLUDES INFORMATION RESERVED FOR USE IN A COMMUNICATION JOB~~ COMMUNICATION APPARATUS, COMMUNICATION CONTROLLING METHOD AND PROGRAM, AND RECORDING MEDIUM FOR STORING THE PROGRAM --

This certificate supersedes the Certificate of Correction issued August 5, 2008.

Signed and Sealed this

Twenty-sixth Day of August, 2008

JON W. DUDAS
*Director of the United States Patent and Trademark Office*